United States Patent
Kittaka et al.

(10) Patent No.: US 7,068,903 B2
(45) Date of Patent: Jun. 27, 2006

(54) OPTICAL ELEMENT USING ONE-DIMENSIONAL PHOTONIC CRYSTAL AND SPECTROSCOPIC DEVICE USING THE SAME

(75) Inventors: Shigeo Kittaka, Osaka (JP); Kazuaki Oya, Osaka (JP); Masatoshi Nara, Osaka (JP); Keiji Tsunetomo, Osaka (JP); Takahiro Asai, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 175 days.

(21) Appl. No.: 10/438,827

(22) Filed: May 16, 2003

(65) Prior Publication Data

US 2004/0008437 A1    Jan. 15, 2004

(30) Foreign Application Priority Data

May 17, 2002    (JP)    ............................... 2002-142449

(51) Int. Cl.
*G02B 6/10*    (2006.01)

(52) U.S. Cl. ...................................... 385/129; 385/131
(58) Field of Classification Search ......... 385/129–132
See application file for complete search history.

(56) References Cited

U.S. PATENT DOCUMENTS

| | | |
|---|---|---|
| 4,279,464 A | 7/1981 | Colombini et al. |
| 5,513,289 A | 4/1996 | Hosokawa et al. |
| 6,011,884 A | 1/2000 | Dueck et al. |
| 6,175,671 B1 * | 1/2001 | Roberts ....................... 385/14 |
| 6,825,963 B1 * | 11/2004 | Kittaka et al. .............. 359/237 |
| 2002/0027655 A1 * | 3/2002 | Kittaka et al. .............. 356/326 |

FOREIGN PATENT DOCUMENTS

WO    WO 99/42892    8/1999

OTHER PUBLICATIONS

1. XP-001033267 Kosaka et al. "Superprism Phenomena in Photonic Crystals: Toward Microscale Lightwvae Circuits" Journal of Lightwave Technology, IEEE. vol. 17, No. 11 Nov. 1999; pp. 2032-2038.
2. XP-009015612 R. Zengerle "Light Propagation in S ingly and Doubly Periodic Planar Waveguides" Journal of Modern Optics. vol. 34, No. 12 1987, pp. 1589-1617.

(Continued)

*Primary Examiner*—Sung Pak
(74) *Attorney, Agent, or Firm*—Whitham, Curtis, Christofferson & Cook P.C.

(57) ABSTRACT

An optical element, composed of an one-dimensional photonic crystal of a triangular prism shape and a multilayer film and a phase modulation unit are used together, with the phase modulation unit adjacent or abutting to a light input end surface of the optical element. Input light is phase-modulated by the phase modulation unit in the same period and direction as those of photonic crystal so that only specific high-order band light can be propagated through the optical element. When this optical element is formed in an optical waveguide, a small-size spectroscopic device having high resolving power can be provided.

21 Claims, 33 Drawing Sheets

OTHER PUBLICATIONS

3. XP-002263737 Nelson et al. "Use of a dielectric stack as one-dimesional photonic crystal for wavelength demultiplexing by beam shifting" Optic Letters vol. No. 25 No. 20 Oct. 15, 2000.

4. XP-000632499 Yu Lin et al. "Highly dispersive photonic band-gap prism" Optic Letters vol. 21, No. 21 Nov. 1, 1996.

5. XP-000917084 Dowling et al. "Anomalous index of refraction in photonic bandgap materials" Journal of Modern Modern Optics vol. 41 No. 2 pp. 345-351 1194.

6. Kosaka et al. "Superprism phenomena in photonic crystals" Physical Review B vol. 58 No. 16 Oct. 15, 1998.

7. P. St. J. Russell "Optics of Floquet-Bloch Waves in Dielectric Gratings" Applied Physics B pp. 231-246 1986.

8. K. Sakoda "Optical Properties of Photonic Crystals" Optical Sciences 2001.

9. K. Shiraishi et al. "Spatial walk-off polarizer utilizing artificial anisotropic dielectrics" Optics Letters vol. 15 No 15,May 1, 1999.

10. Technical Digest; "International Workshop on Photonic and Electromagnetic Crystals Structure" Mar. 8-10, 2000.

11. Joannopoulos et al. Photonic Crystals "Molding the Flow of Light" Princeton University Press 1995.

12. Plihal et al. Photonic band structures of two-dimension systems: The triangular lattice vol. 44 No. 16 Oct. 15, 1991.

13. Optical Society of Japan, 27th Winter Meeting Document, pp. 41-53 2001 with English translation.

14. Bishoukougaku Handbook p. 224 Asakura Shoten, 1995.

15. European Search Report dated Dec. 18, 2003.

* cited by examiner

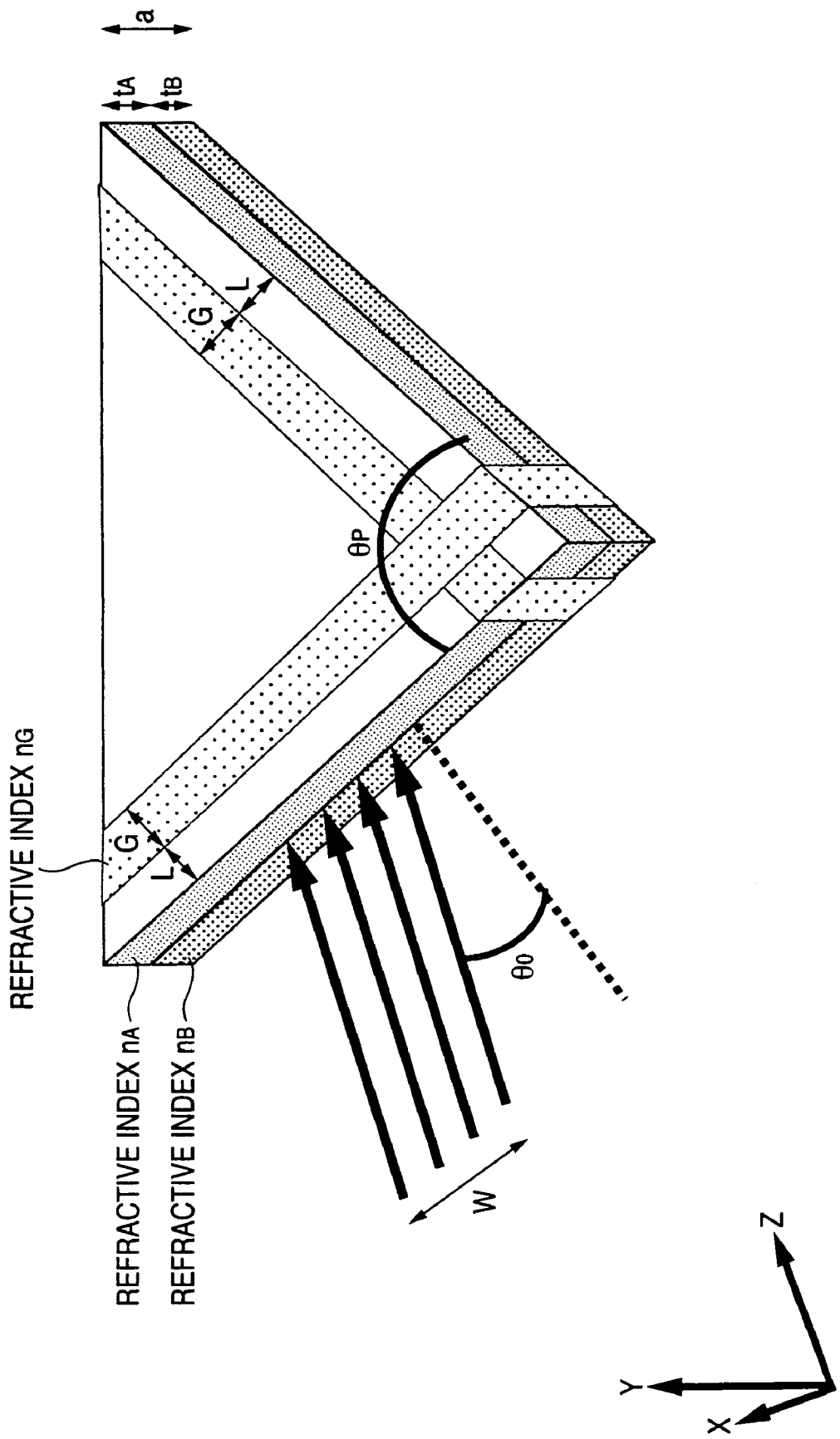

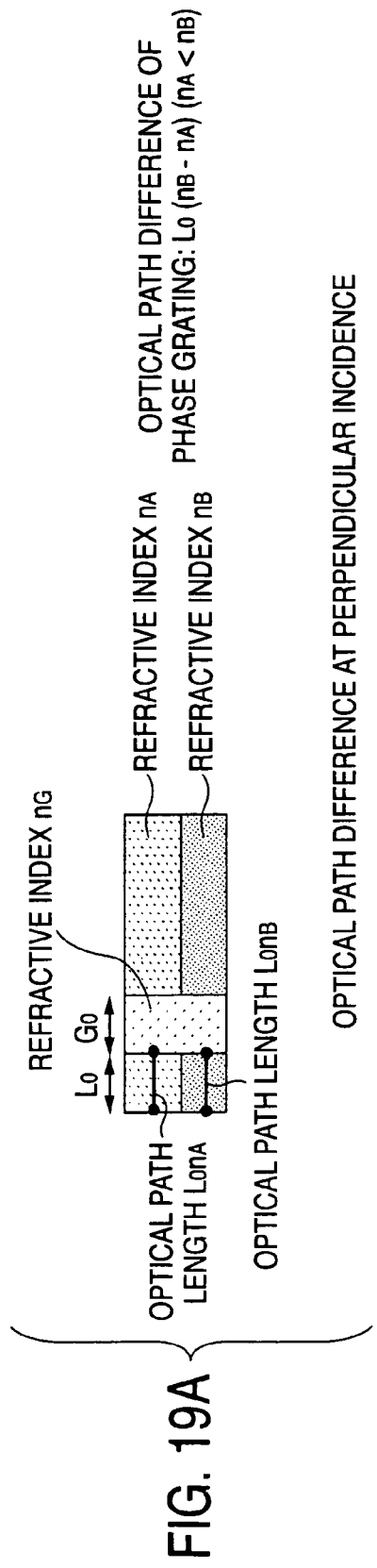

FIG. 19A

REFRACTIVE INDEX $n_G$
REFRACTIVE INDEX $n_A$
REFRACTIVE INDEX $n_B$

OPTICAL PATH LENGTH $L_0 n_A$
OPTICAL PATH LENGTH $L_0 n_B$

OPTICAL PATH DIFFERENCE OF PHASE GRATING: $L_0 (n_B - n_A)$ ($n_A < n_B$)

OPTICAL PATH DIFFERENCE AT PERPENDICULAR INCIDENCE

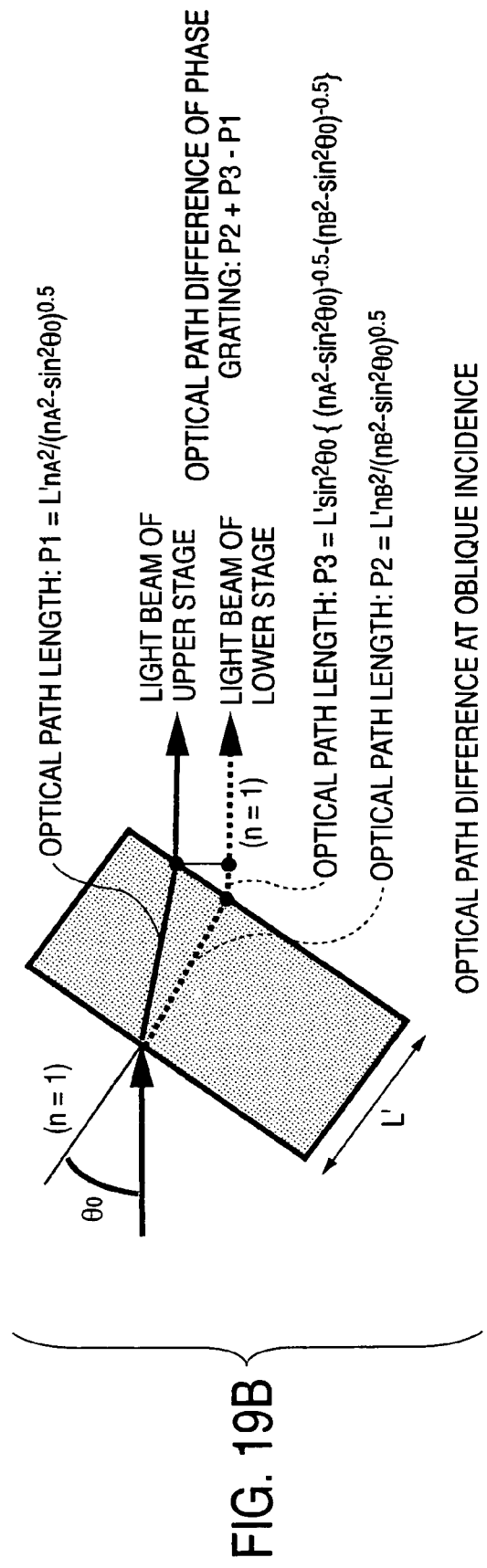

FIG. 19B

LIGHT BEAM OF UPPER STAGE
LIGHT BEAM OF LOWER STAGE

OPTICAL PATH LENGTH: $P1 = L' n_A^2/(n_A^2 - \sin^2\theta_0)^{0.5}$
OPTICAL PATH LENGTH: $P3 = L' \sin^2\theta_0 \{(n_A^2 - \sin^2\theta_0)^{-0.5} - (n_B^2 - \sin^2\theta_0)^{-0.5}\}$
OPTICAL PATH LENGTH: $P2 = L' n_B^2/(n_B^2 - \sin^2\theta_0)^{0.5}$

OPTICAL PATH DIFFERENCE OF PHASE GRATING: $P2 + P3 - P1$

OPTICAL PATH DIFFERENCE AT OBLIQUE INCIDENCE

CALCULATED ANGLES ACCORDING
TO LAW OF REFRACTION

ELECTRIC FIELD ON PLANE AT
CENTER OF MEDIUM A

ELECTRIC FIELD ON PLANE AT
CENTER OF MEDIUM B

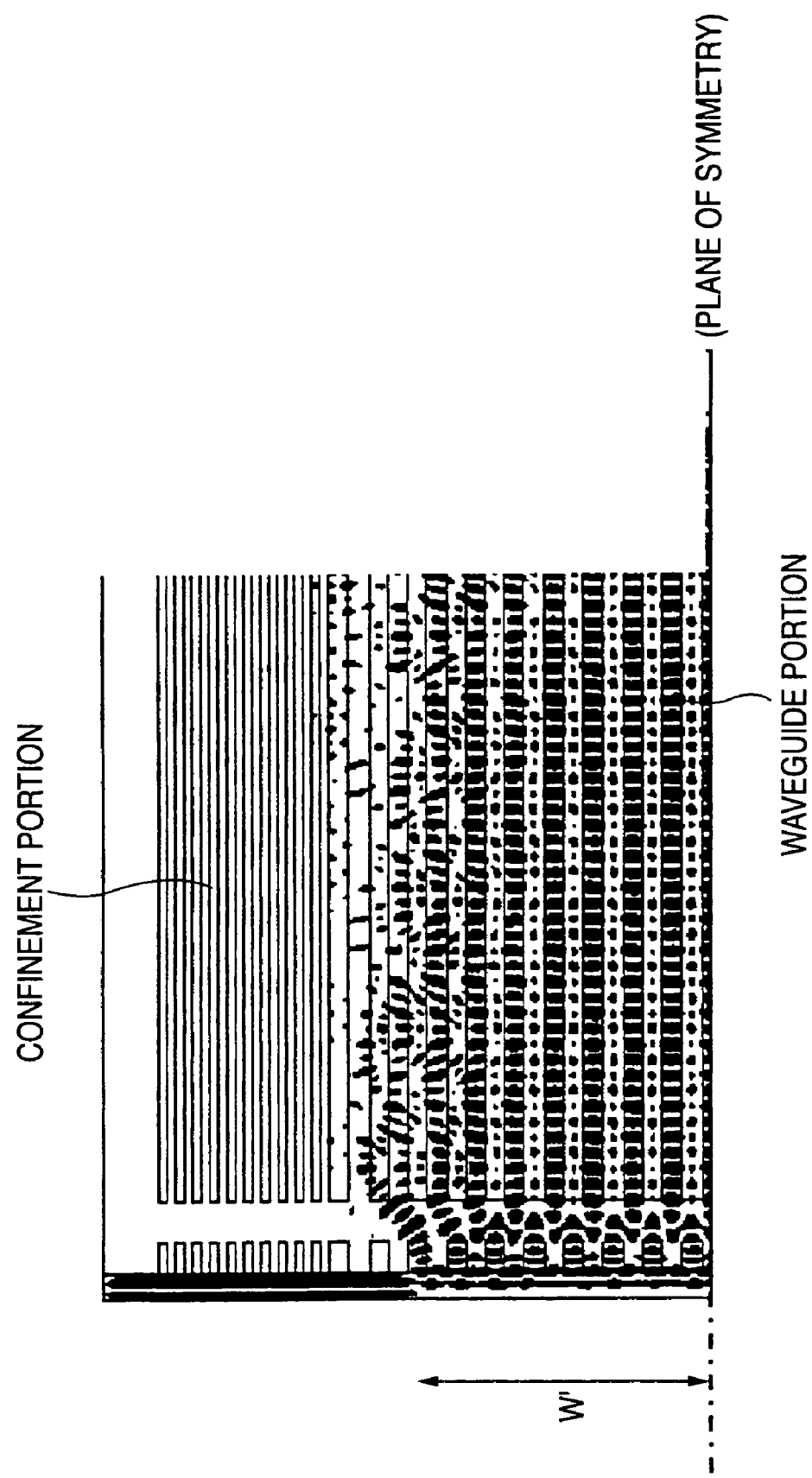

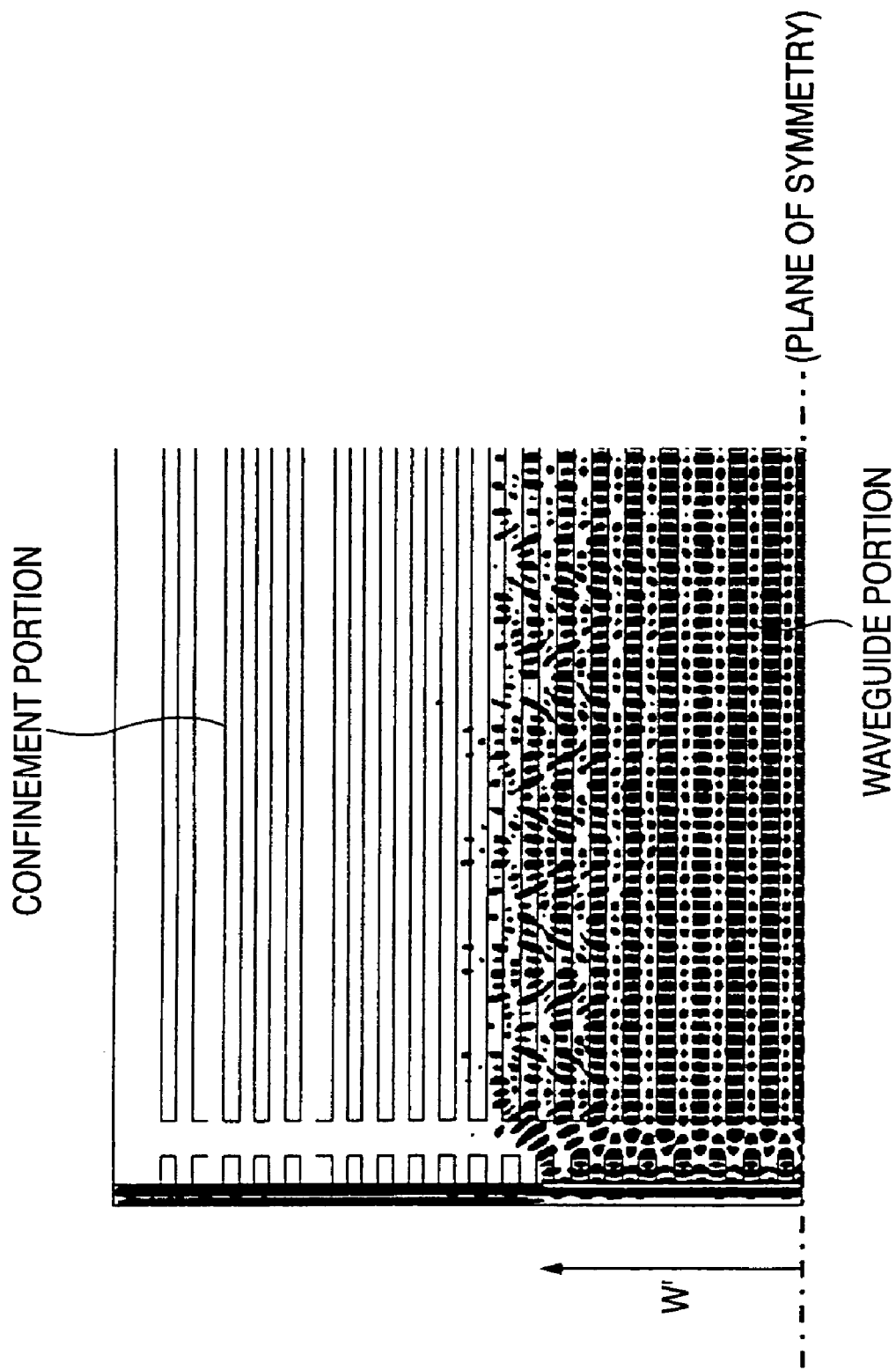

CALCULATED ANGLES ACCORDING
TO LAW OF REFRACTION

ELECTRIC FIELD ON PLANE AT
CENTER OF MEDIUM A

ELECTRIC FIELD ON PLANE AT
CENTER OF MEDIUM B

CALCULATED ANGLES ACCORDING
TO LAW OF REFRACTION

ELECTRIC FIELD ON PLANE AT
CENTER OF MEDIUM A

ELECTRIC FIELD ON PLANE AT
CENTER OF MEDIUM B 8.5°

ELECTRIC FIELD ON PLANE AT CENTER OF MEDIUM A

ELECTRIC FIELD ON PLANE AT CENTER OF MEDIUM B

ELECTRIC FIELD ON PLANE AT CENTER OF MEDIUM A

ELECTRIC FIELD ON PLANE AT CENTER OF MEDIUM B

→ 3.0°

ELECTRIC FIELD ON PLANE AT
CENTER OF MEDIUM A

ELECTRIC FIELD ON PLANE AT
CENTER OF MEDIUM B 15.0°

ELECTRIC FIELD ON PLANE AT
CENTER OF MEDIUM A

ELECTRIC FIELD ON PLANE AT
CENTER OF MEDIUM B

ELECTRIC FIELD ON PLANE AT
CENTER OF MEDIUM A

ELECTRIC FIELD ON PLANE AT
CENTER OF MEDIUM B

ELECTRIC FIELD ON PLANE AT
CENTER OF MEDIUM A

ELECTRIC FIELD ON PLANE AT
CENTER OF MEDIUM B

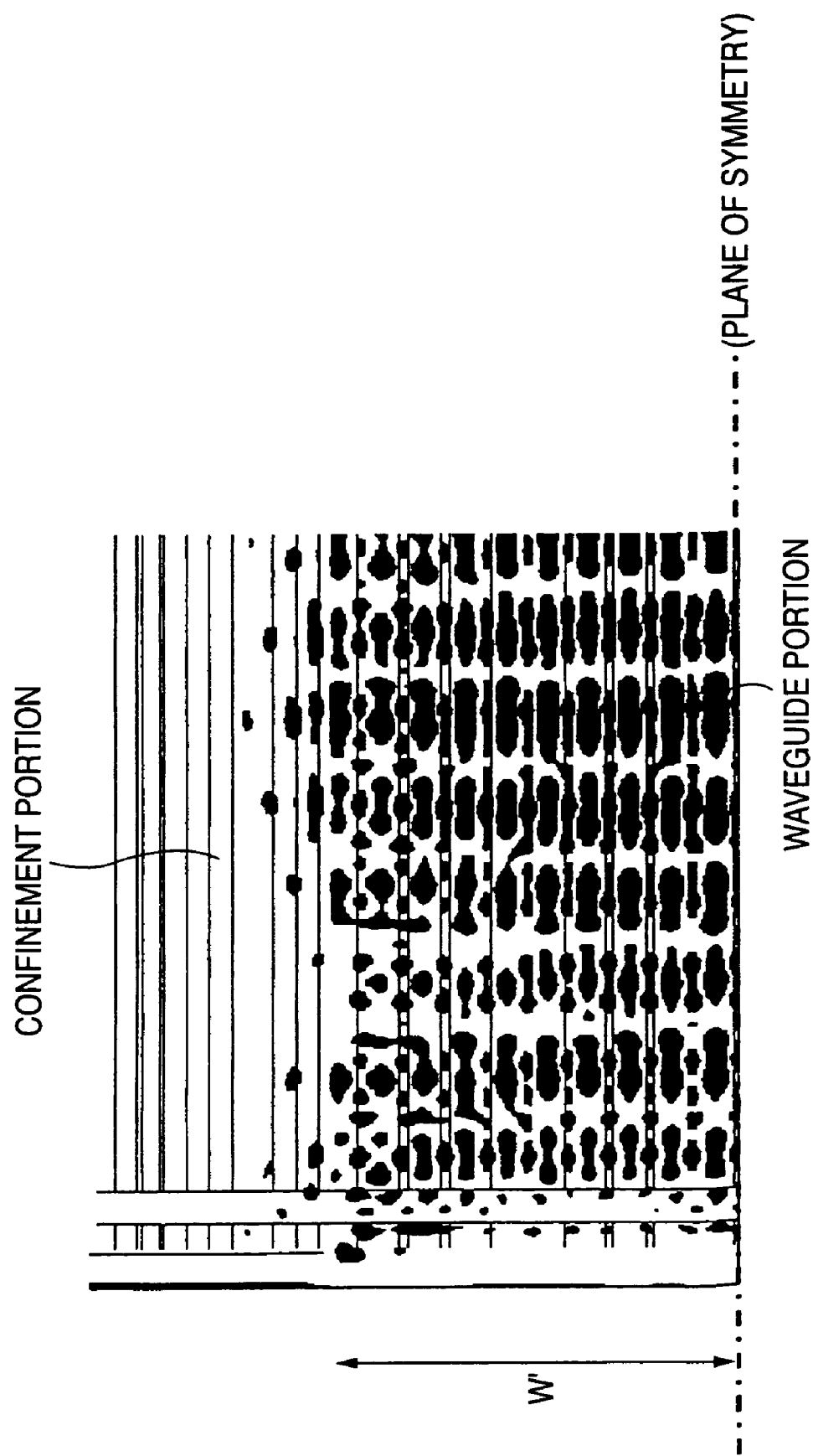

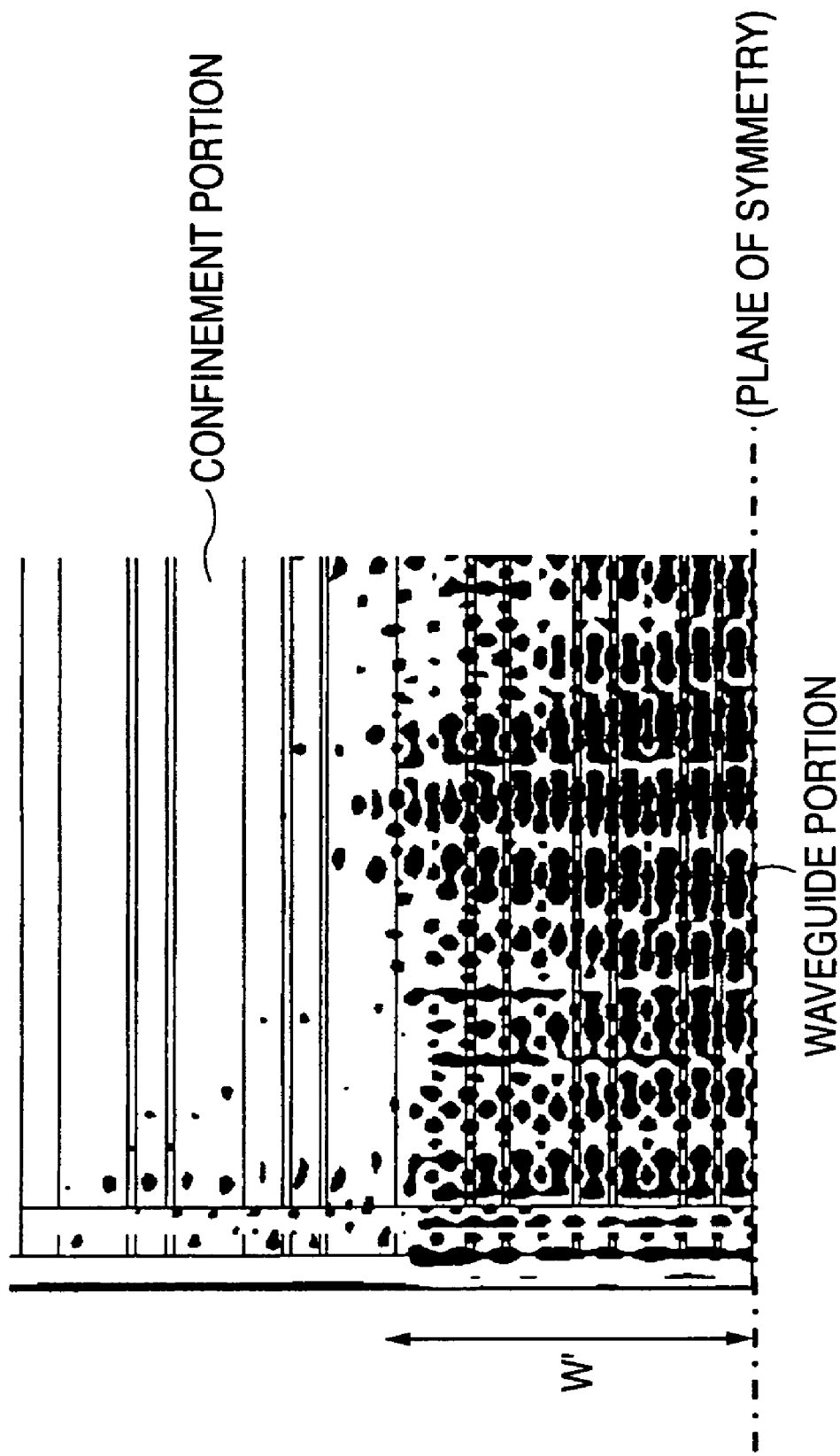

OPTICAL ELEMENT USING ONE-DIMENSIONAL PHOTONIC CRYSTAL AND SPECTROSCOPIC DEVICE USING THE SAME

The present application is based on Japanese Patent Application No. 2002-142449, the entire contents of which are incorporated herein by reference.

BACKGROUND OF THE INVENTION

1. Field of the Invention

The present invention relates to an optical element, especially a wavelength dispersion element used in an optical communication system, an optical measuring system, etc.

2. Related Art

It is known well that photonic crystals having a structure in which dielectric materials different in refractive index are arranged periodically at intervals of about a wavelength of light has the following properties;

(a) confinement of light by photonic band gaps;
(b) very large wavelength dispersion due to a unique photonic band structure; and
(c) abnormality in group velocity of propagated light.

Various optical elements using these properties have been proposed.

Photonic crystals can be classified into three groups by the number of directions having periodic structures as follows:

(i) one-dimensional photonic crystals;
(ii) two-dimensional photonic crystals; and
(iii) three-dimensional photonic crystals.

For example, the simplest one-dimensional photonic crystal is a dielectric multilayer filter formed in such a manner that two kinds of thin films (e.g., $SiO_2$ and $TiO_2$) are laminated alternately on a parallel-plane substrate. The dielectric multilayer filter has been already put into practical use. Because this structure has photonic band gaps in the periodic direction, this structure has a function of reflecting only incident light of a specific wavelength region. Furthermore, because the wavelength region in the photonic band gap with respect to oblique incident light varies according to the direction of polarization, this structure can be made to function as a polarized light separating filter.

Although the one-dimensional photonic crystal has a large merit that easy to produce, the one-dimensional photonic crystal has not been investigated as much as two-dimensional and three-dimensional photonic crystals because there are few methods making good use of the properties of photonic crystals except the aforementioned filter. The one-dimensional photonic crystal, however, can use the property of "very large wavelength dispersion due to a unique band structure" or "abnormality in group velocity of propagated light" sufficiently though the one-dimensional photonic crystal is inferior in the function of "confinement of light by photonic band gaps" to two-dimensional and three-dimensional photonic crystals. As means using the property, there is an example in which an end surface of the multilayer film, particularly, a surface of the exposed multilayer structure, is used as a light input surface or as a light output surface.

For example, theoretical analysis of the direction of light rays incident onto an inclined section of the multilayer film has been described in Applied Physics B, Vol.39, p.231, 1986. There has been disclosed the fact that the same polarized light separating effect as in a birefringent material can be obtained by use of the property (so-called structural birefringence) that the refractive index of the multilayer film varies widely according to whether the polarization is TE polarization or TH polarization, with intention of separating polarized light by structural birefringence (Optics Letters, Vol.15, No.9, p.516, 1990). There has been further a report that very large dispersion (super-prism effect) can be obtained because the shape of the first photonic band of the periodic multilayer film is linear in a neighbor of a band gap ("International Workshop on Photonic and Electromagnetic Crystal Structures" Technical Digest, F1–3).

A structure in which air holes are arranged in a thin film on a substrate by application of photolithography has been already examined well as a structure of two-dimensional photonic crystal. If a linear defect in formed in the arrangement of the air holes, the portion of the linear defect can be provided as an optical waveguide.

If the photonic band gap is provided throughout all directions in three-dimensional photonic crystal, a three-dimensional waveguide can be provided. Accordingly, there is expectation that a large number of optical elements can be incorporated in an element about 1 mm square when three-dimensional photonic crystal in used.

A spectroscopic element using photonic crystal is also called super-prism. Very large wavelength dispersion can be obtained compared with a general prism or diffraction grating. For example, Physical Review B, Vol.58, No.16, p.R1096, 1998 has reported an experimental result that angular dispersion per 1% wavelength difference in use of three-dimensional photonic crystal amounts to tens of degrees. When, for example, a material large in wavelength dispersion is used as a spectroscopic element for separating a signal containing different wavelengths in wavelength division multiplexing (WDM) communication, the size of the device as a whole can be reduced to be very small.

Incidentally, when photonic crystal is to be used as a practical spectroscopic element, there are several problems.

Parallel light flux is spread at a certain angle by a diffraction phenomenon. The spread of light flux becomes wide as the light flux becomes thin. It is therefore preferable that the light flux is thick sufficiently to obtain a spectroscopic element with high wavelength resolving power, Conversely, if the light flux is thin, even a spectroscopic element large in angular difference due to wavelengths cannot exhibit high resolving power.

To secure such thick light flux, the size of the element must be large to a certain degree. In addition, it is inevitable that the length of the optical path of light propagating in the element becomes long. It is however difficult to produce a large element in the case of two-dimensional or three-dimensional photonic crystals. Furthermore, attenuation of light in the elements often exhibits a large value. Accordingly, it is difficult to form a practical spectroscopic element.

SUMMARY OF THE INVENTION

The invention is developed to solve the problems and an object of the invention is to provide a spectroscopic element large in wavelength dispersion. Another object of the invention is to provide a small-size spectroscopic device using the spectroscopic element.

In the invention, a spectroscopic element large in wavelength dispersion is obtained in such a manner that light is input in an a periodic direction of a one-dimensional photonic crystal (periodic structural multilayer film) processed into a prismatic shape, so that wave due to a high-order band is propagated through the photonic crystal to thereby obtain large wavelength dispersion. Because a method for producing such a periodic multilayer film has been already established, large-area periodic multilayer films can be mass-produced.

The aforementioned operation is achieved by the following means.

An optical element using one-dimensional photonic crystal according to the invention includes a multilayer structure at least one portion of which is a periodic structural portion regarded as a one-dimensional photonic crystal having a predetermined period. The multilayer structure has two end surfaces substantially perpendicular to layer surfaces of the multilayer structure. One of the two end surfaces is used as a light input surface and the other is used as a light output surface. The light output surface is inclined at an inclination angle to the light input surface. Directions of propagation of input beams incident onto the light input surface, beams propagated in the multilayer structure and output beams emerging from the light output surface are set to be perpendicular to a periodic direction of the periodic structural portion.

A periodic structural multilayer film is processed into a prismatic shape to thereby achieve the optical element having the aforementioned structure.

Preferably, a phase modulation unit is provided adjacent or abutting to the light input surface. When input light is phase-modulated by the phase modulation unit in the same period and direction as those of the photonic crystal, only specific high-order band light can be propagated.

Preferably, in this case, a phase modulation unit is further provided adjacent or abutting to the light output surface. By the phase modulation unit, the propagated high-order band light can be output as a plane wave.

Preferably, a reflecting layer is provided on one or each of opposite surfaces of the multilayer structure parallel to the layer surfaces of the multilayer structure. The reflecting layer can be achieved by a periodic multilayer film. The formation of the reflecting layer can prevent light propagating in the optical element from emerging as a loss from other surfaces than the light output surface.

Preferably, light capable of propagating as wave belonging to the second lowest coupled photonic band is used as the light propagated through the periodic structural portion.

A spectroscopic device using the optical element includes the optical element, a light input optical system for inputting a wavelength division multiplexing optical signal to a light input surface of the optical element, and a light output optical system for discriminating optical signals spectroscopically output from the optical element in accordance with wavelengths. Preferably, the light input optical system includes a collimating unit form converting input beams into parallel beams. By the collimating unit, broad input light can be obtained, so that the angular resolving power of the spectroscopic device can be improved.

Preferably, the light input optical system includes: a linear optical waveguide or optical fiber for guiding the wavelength division multiplexing optical signal; a slab optical waveguide having an input end connected to a light output end of the linear optical waveguide or optical fiber, and an output end connected to the light input surface of the optical element; and a beam-condensing element provided in the slab optical waveguide for converting propagated beams into parallel beams.

Preferably, the light output optical system includes a light coupling unit for coupling the optical signals spectroscopically output from the optical element to a plurality of light propagation units. Especially preferably, the light output optical system includes: a slab optical waveguide having an input end connected to the light output surface of the optical element; a plurality or linear optical waveguides or optical fibers connected to an output end of the slab optical waveguide; and a beam-condensing element provided in the slab optical waveguide for coupling propagated beams to the plurality of linear optical waveguides or optical fibers.

Preferably, the beam-condensing element is a waveguide lens which is provided in the slab optical waveguide and which is a portion different in refractive index from the slab optical waveguide and shaped like a lens. Or the beam-condensing element is a diffraction lens provided in the slab optical waveguide. Or the beam-condensing element is formed as a structure in which a boundary surface between the slab optical waveguide and the light input surface or light output surface of the optical element is formed as a curved surface.

BRIEF DESCRIPTION OF THE DRAWINGS

FIG. 18 is a view for explaining the condition of a calculation example of a spectroscopic element using a triangular prism-shaped one-dimensional photonic crystal;

FIGS. 19A and 19B are views for explaining a method of conversionally calculating the thickness of a phase grating at oblique incidence of light;

FIG. 22 is a view showing a result of another electromagnetic wave simulation concerning confinement of light in the Y-axis direction (in the case where no phase grating is provided);

FIG. 23 is a view showing a result of another electromagnetic wave simulation concerning confinement of light in the Y-axis direction (in the case where no phase grating is provided);

FIG. 32 is a view showing a result of another electromagnetic wave simulation concerning confinement of light in the Y-axis direction (in the case where phase gratings are provided); and FIG. 33 is a view showing a result of another electromagnetic wave simulation concerning confinement of light in the Y-axis direction (in the case where phase gratings are provided).

DETAILED DESCRIPTION OF THE PREFERRED EMBODIMENTS

Embodiments of the invention will be described below specifically.

Figure 1:
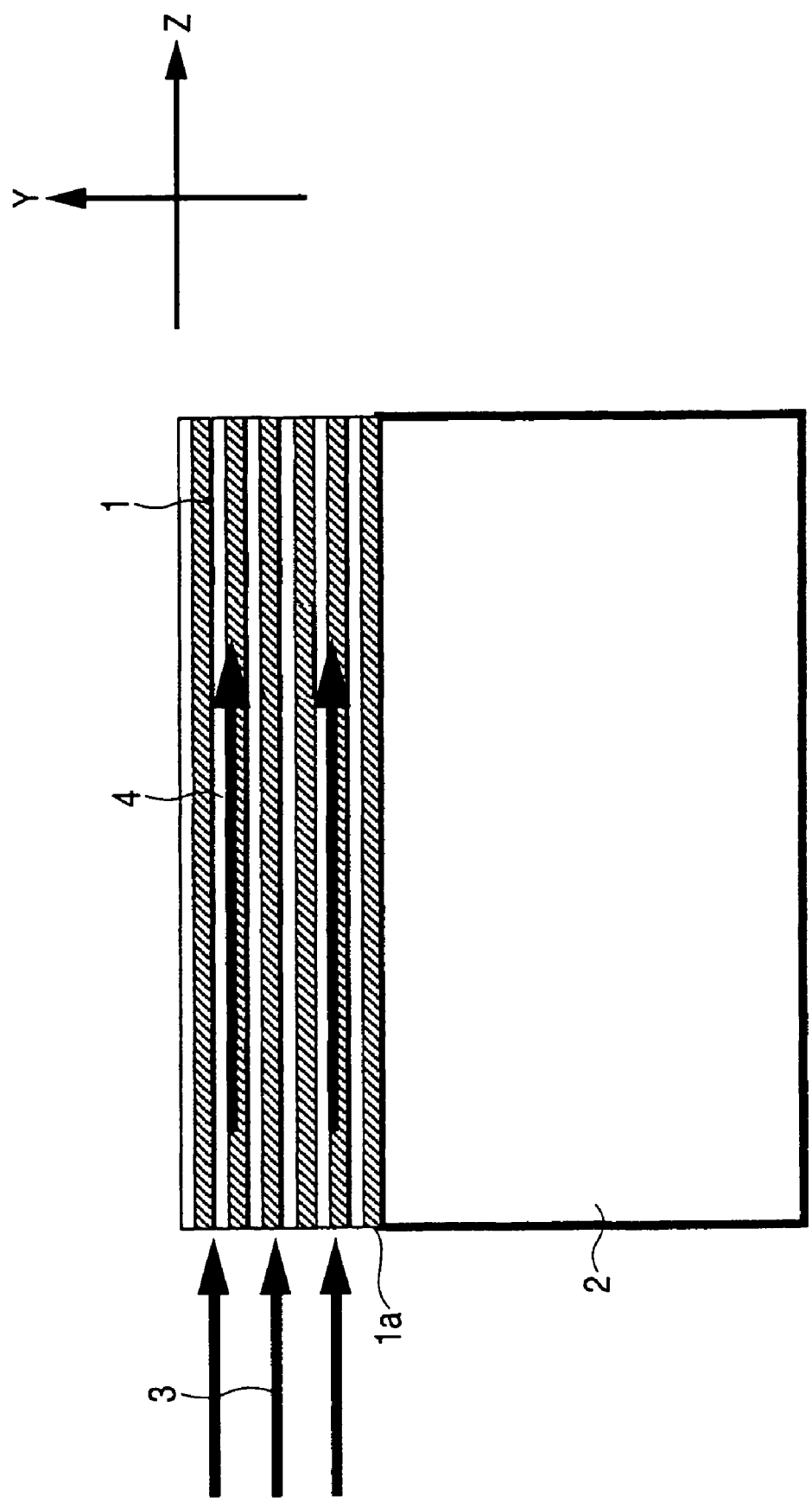
FIG. 1 is a typical view showing propagation of light in a periodic multilayer film.

FIG. 1 is a sectional view typically showing a periodic multilayer film constituting a basic structure of the invention. A periodic multilayer film 1 is formed on a surface of a substrate 2. For example, the multilayer film is formed as a structure in which layers of a substance A (refractive index: $n_A$) with a thickness of $t_A$ and layers of a substance B (refractive index: $n_B$) with a thickness of $t_B$ are laminated alternately at intervals of a period $a=(t_A+t_B)$. Assume that a front surface of the multilayer film 1 abuts on air.

When input light flux 3 with a wavelength of $\lambda_0$ in a vacuum is incident onto an end surface 1a of the periodic multilayer film in FIG. 1, how the light propagates in the multilayer film is analyzed. It is found from the analysis that the periodic multilayer film in a predetermined condition serves as so-called photonic crystal to make propagated light 4 exhibit a unique effect.

The characteristic of light propagating in photonic crystal can be found when photonic bands are calculated and mapped. For example, a method of band calculation has been described in detail in "Photonic Crystals", Princeton University Press (1995) or Physical Review B, Vol.44, No.16, p.8565, 1991.

Figure 2:
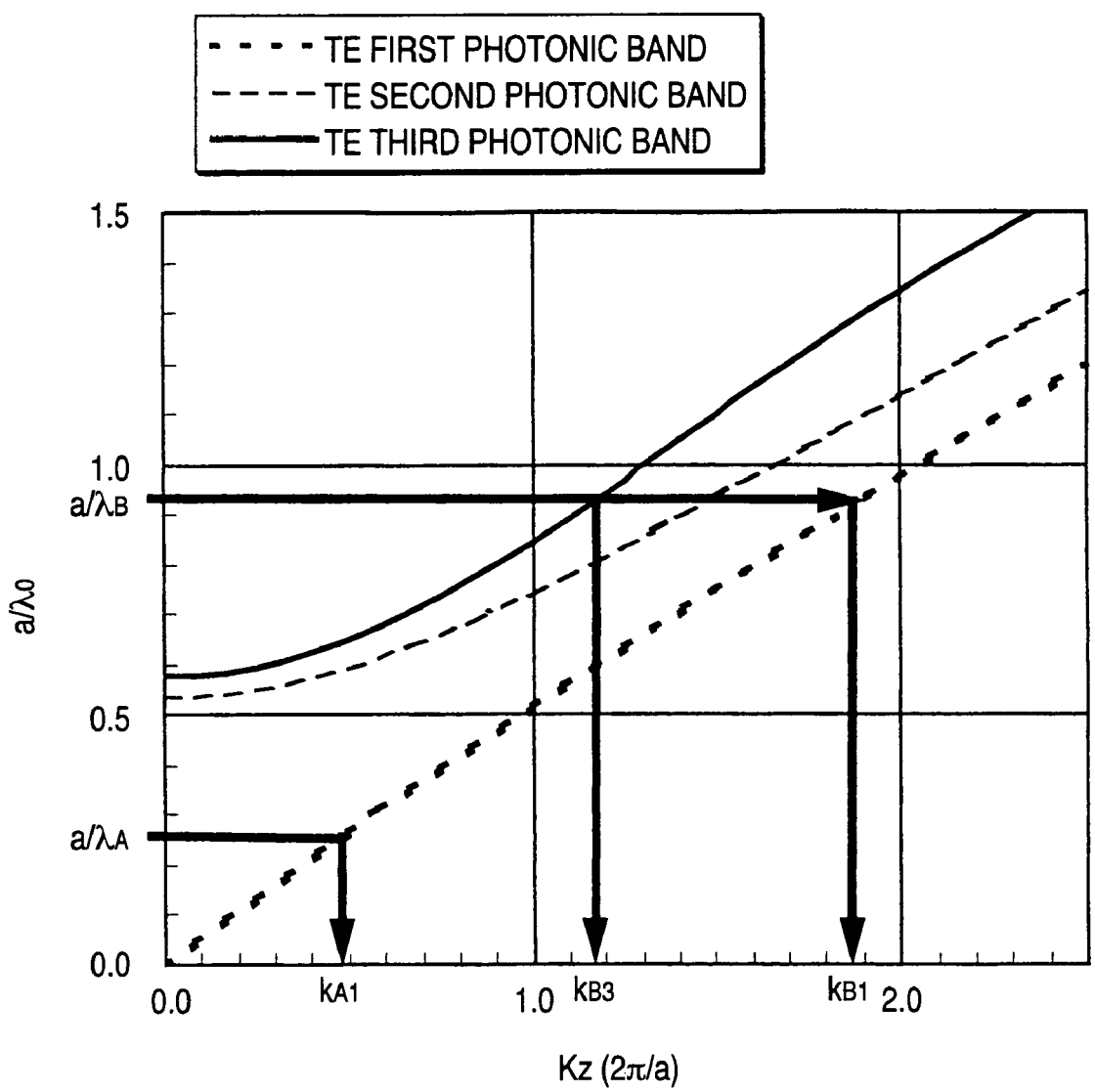
FIG. 2 is a graph showing a photonic band structure (TE polarization) of the periodic multilayer film.
Figure 3:
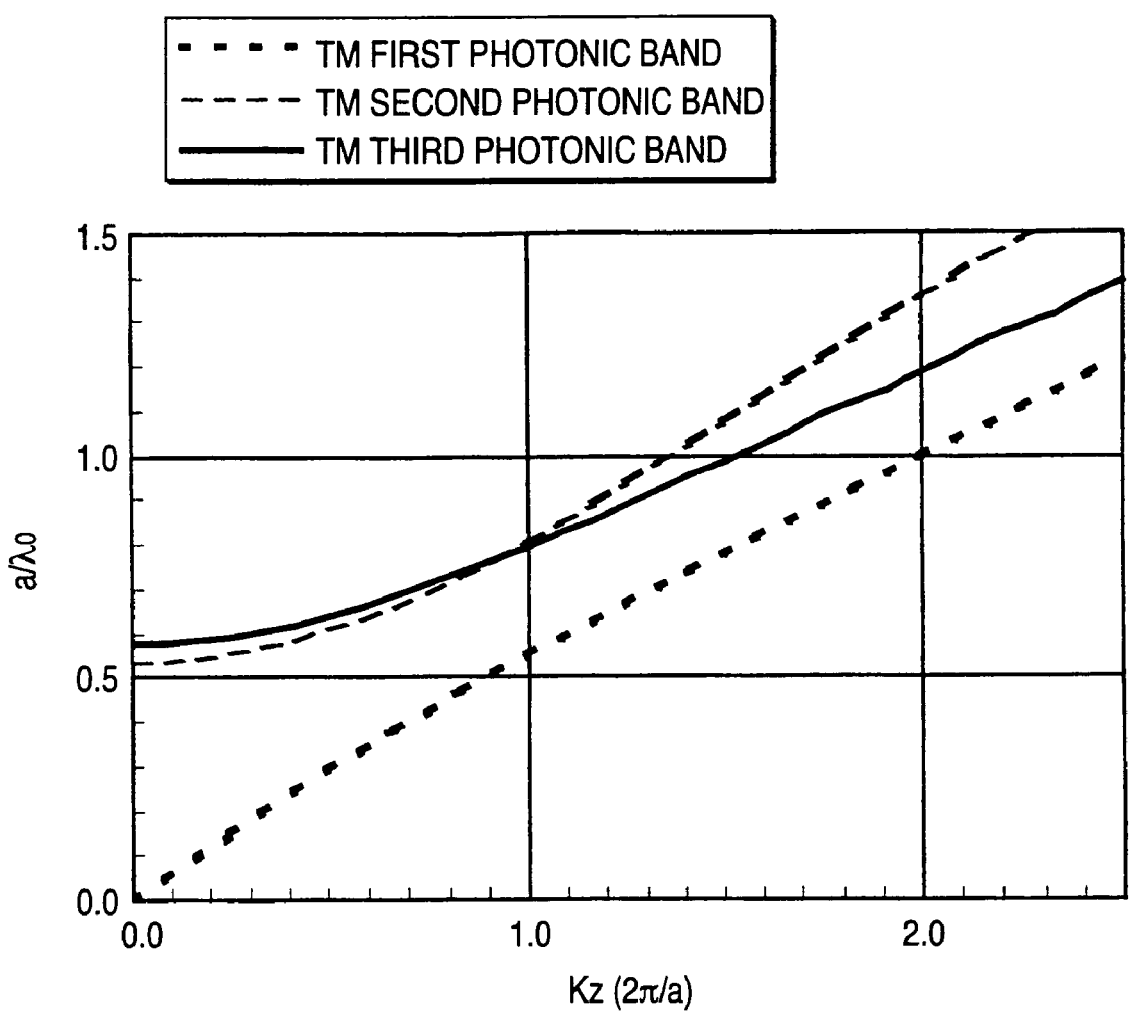
FIG. 3 is a graph showing a photonic band structure (TM polarization) of the periodic multilayer film.

Assume now that the periodic multilayer film shown in FIG. 1 has a periodic structure continuing infinitely in a Y direction (laminating direction) and spreads infinitely in X and Z directions (spreading directions of layer surfaces). FIGS. 2 and 3 show results of band calculation concerning first, second and third photonic bands in TE polarization (FIG. 2) and TM polarization (FIG. 3) by a plane wave method in the Z-axis direction (or the X-axis direction) about the multilayer structure in which layers with refractive index $n_A$ and layers with refractive index $n_B$ are laminated alternately at regular intervals of a period a.

$n_A=1.44$ $(t_A=0.5a)$ $n_B=2.18$ $(t_B=0.5a)$

In FIGS. 2 and 3, TE polarization expresses polarization in the case where the direction of electric field is the X-axis direction, and TM polarization expresses polarization in the case where the direction of magnetic field is the X-axis direction.

In each of FIGS. 2 and 3, the horizontal axis shows the magnitude of a wave vector $k_z$ in the Z-axis direction, and the vertical axis shows a normalized frequency represented by the expression:

$$\omega a/2\pi c$$

in which $\omega$ is an angular frequency of incident light, a is a period of the structure, and c is a velocity of light in a vacuum.

Because the normalized frequency can be also expressed as $a/\lambda_0$ in which $\lambda_0$ is the wavelength of incident light in a vacuum, the normalized frequency will be hereinafter described as $a/\lambda_0$. Because there is no periodicity in the Z-axis direction, the horizontal axis in each of FIGS. 2 and 3 spreads infinitely without any Brillouin zone boundary.

As shown in FIG. 2, when the wavelength of incident light is $\lambda_A$ in a vacuum, a wave vector $k_{AL}$ corresponding to the first lowest band is present in the photonic crystal. In other words, the light propagates as a wave with wavelength $\lambda_{A1}=2\pi/k_{A1}$ (hereinafter referred to as first photonic band light) in the Z-axis direction in the photonic crystal.

On the other hand, when the wavelength of incident light is $\lambda_B$ in a vacuum, wave vectors $k_{B1}$ and $k_{B2}$ corresponding to the first and third photonic bands are present in the photonic crystal. In this case, the second photonic band is neglected because the second photonic band is an "uncoupled" band with respect to propagation in the Z-axis direction. Accordingly, a wave with wavelength $\lambda_{B1}=2\pi/k_{B1}$ as the first photonic band light and a wave with wavelength $\lambda_{B3}=2\pi/k_{B3}$ are propagated in the Z-axis direction in the photonic crystal. Other coupled photonic bands such as the third photonic band in FIG. 2 than the first photonic band are hereinafter generally referred to as "high-order propagation bands". Generally, one of the second and third photonic bands is a coupled photonic band and the other is an uncoupled band. The first photonic band is a coupled photonic band. Incidentally, the theory of uncoupled bands has been described in detail in the following book.

K. Sakoda "Optical Properties of Photonic Crystals" Springer-Verlag (2001).

Now, a numerical value obtained by dividing a wavelength ($\lambda_A$, $\lambda_B$, etc.) in a vacuum by a corresponding wavelength ($\lambda_{A1}$, $\lambda_{B3}$, etc.) in the photonic crystal is defined as "effective refractive index". As is to be understood from FIG. 2, $a/\lambda_0$ (vertical axis) and kz (horizontal axis) in the first photonic band light are substantially proportional to each other. Accordingly, the effective refractive index in the first photonic band light is substantially constant regardless of the change of $\lambda_0$. The effective refractive index in the high-order propagation band light, however, varies widely according to $\lambda_0$. As is obvious from FIGS. 2 and 3, there is a possibility that the effective refractive index in the high-order propagation band light may be lower than 1.

Figure 4:
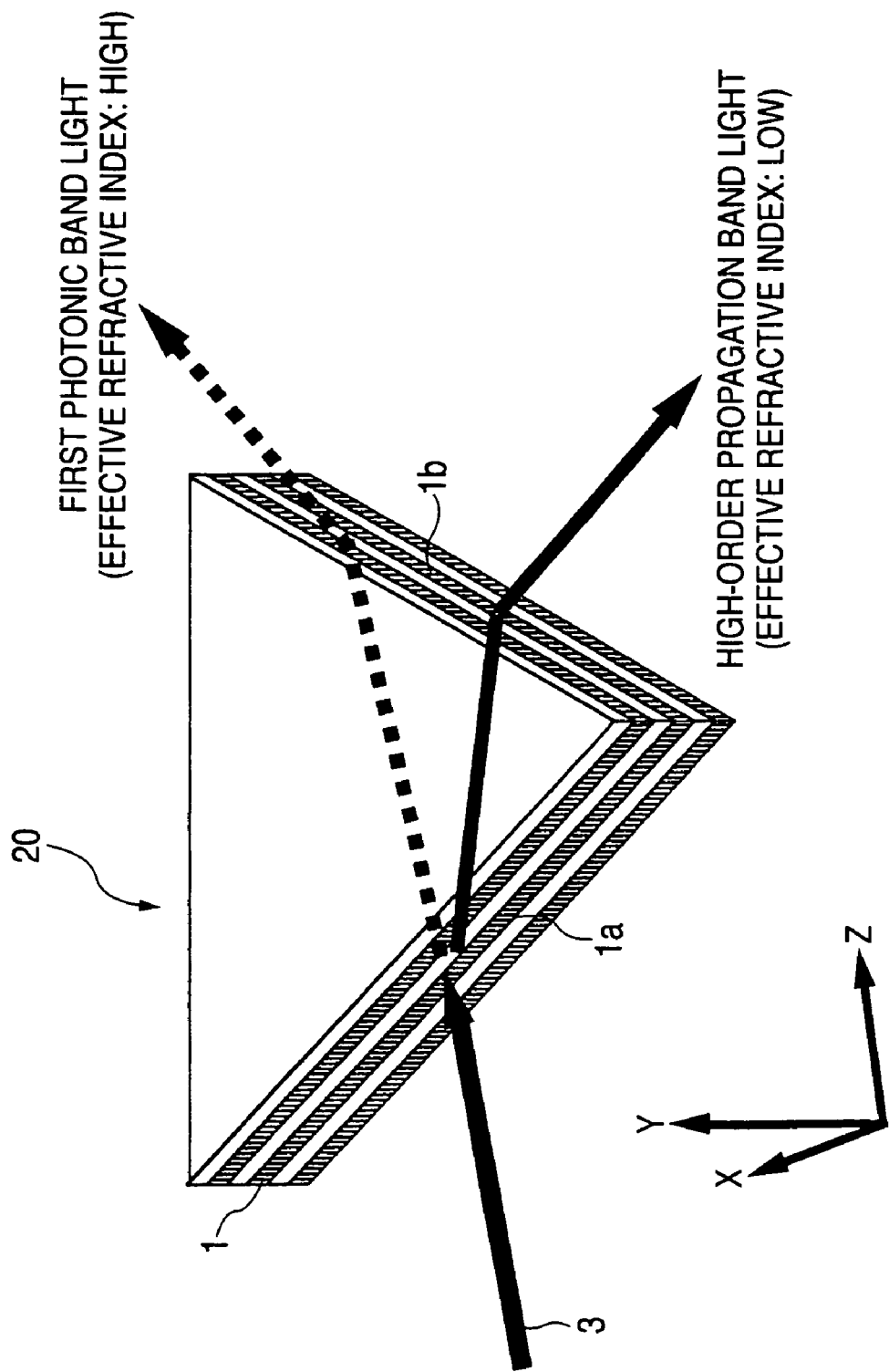
FIG. 4 is a view showing a state of refraction of light in a one-dimensional photonic crystal having a triangular prism structure.

FIG. 4 shows a one-dimensional photonic crystal 20 having a triangular prism structure. Each of end surfaces 1a and 1b for inputting and outputting light flux is perpendicular to layer surfaces of the periodic multilayer film 1, that is, parallel to the periodic direction (Y-axis direction). The end surfaces 1a and 1b form a predetermined angle therebetween. When input light flux 3 as a plane wave is obliquely incident onto the end surface 1a, refraction corresponding to the effective refractive index occurs. Although the first photonic band light exhibits only wavelength dispersion substantially equivalent to that of a general homogeneous medium, the high-order propagation band light exhibits very large wavelength dispersion because the effective refractive index varies largely according to the input wavelength as described above. It can be said that this is a kind of super-prism effect.

When the prism effect for the high-order propagation band light is to be used by the configuration shown in FIG. 4, there are however some problems.

As is obvious from FIGS. 2 and 3, the first photonic band light is always propagated when the high-order propagation band light is propagated. When the high-order propagation band light is used, the first photonic band light serves as stray light which causes lowering of the signal to noise ratio of the element as well as the first photonic band light is an energy loss which causes greater reduction in efficiency in use of the input light.

Furthermore, the periodic structure in the Y-axis direction is exposed at the output side end surface 1b in FIG. 4. On the other hand, the high-order propagation band light per se has periodicity of intensity and phase in the Y-axis direction. Accordingly, because light rays diffracted in various orders are mixed as output light, the output light is harder to handle than a simple plane wave.

Furthermore, when the effective refractive index in the high-order propagation band light is lower than the refractive index of one of upper and lower media abutting on the prism, propagated light is leaked to the medium side by refraction. Particularly when the effective refractive index in the high-order propagation band light is lower than 1, the leakage cannot be prevented even in the case where the medium is air.

Incidentally, according to the inventors' examination, it has become clear that only specific high-order propagation band light can be propagated through the one-dimensional photonic crystal if input light is phase-modulated.

Figure 5:
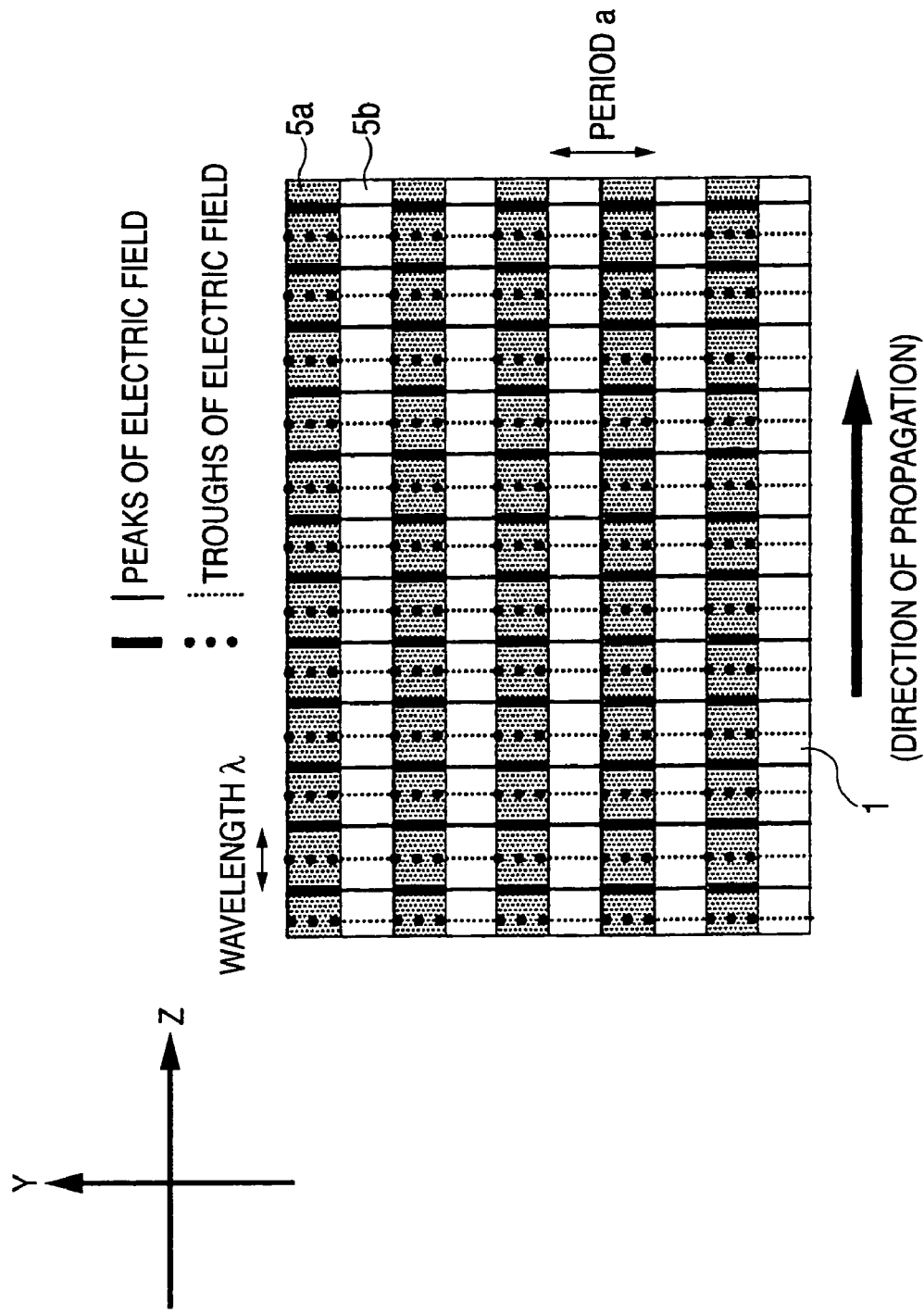
FIG. 5 is a typical view showing electric field in first photonic band propagation light.
Figure 6:
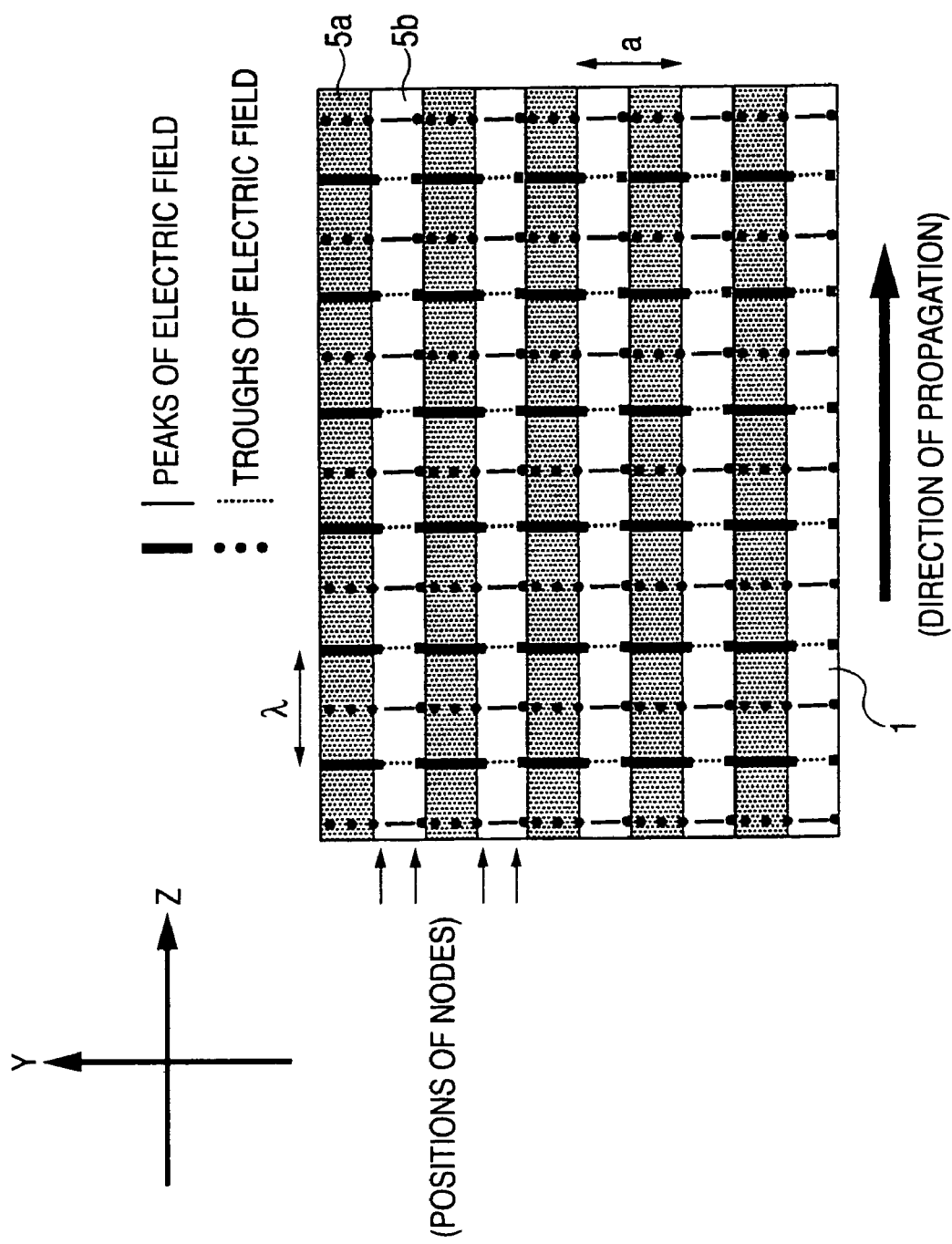
FIG. 6 is a typical view showing electric field in high-order coupled photonic band propagation light.

FIGS. 5 and 6 typically show the electric field intensity of light propagated in the Z-axis direction in the one-dimensional photonic crystal (period: a) in which layers of a substance A and layers of a substance B are laminated alternately. In each of FIGS. 5 and 6, the solid lines show peaks of electric field, the broken lines show troughs of electric field, and the thickness of each line shows the magnitude of amplitude.

As shown in FIG. 5, the first photonic band light propagates like a plane wave because peaks and troughs of electric field form planes perpendicular to the Z axis respectively, although the amplitude of electric field in the medium A (5a) is different from that in the medium B (5b).

In case of the high-order propagation band light, however, "nodes" in which the amplitude of electric field becomes zero are generated, for example, as shown in FIG. 6. As a result, one period is divided into two regions. Peaks and troughs appear alternately in adjacent regions because the phase of wave shifts by a half wavelength between adjacent regions. The case where two nodes are generated in one period as described above is the case of the second or third photonic band. In propagated light due to a higher-order band, the number of nodes generated in one period becomes so large that the phase shift of a half wavelength is repeated by a plurality of times in one period.

Accordingly, propagated light rays corresponding to input light with a wavelength (e.g., $\lambda_B$ in FIG. 2) in which a plurality of bands are concerned overlap each other so that a complex electric field pattern is exhibited.

Figure 7:
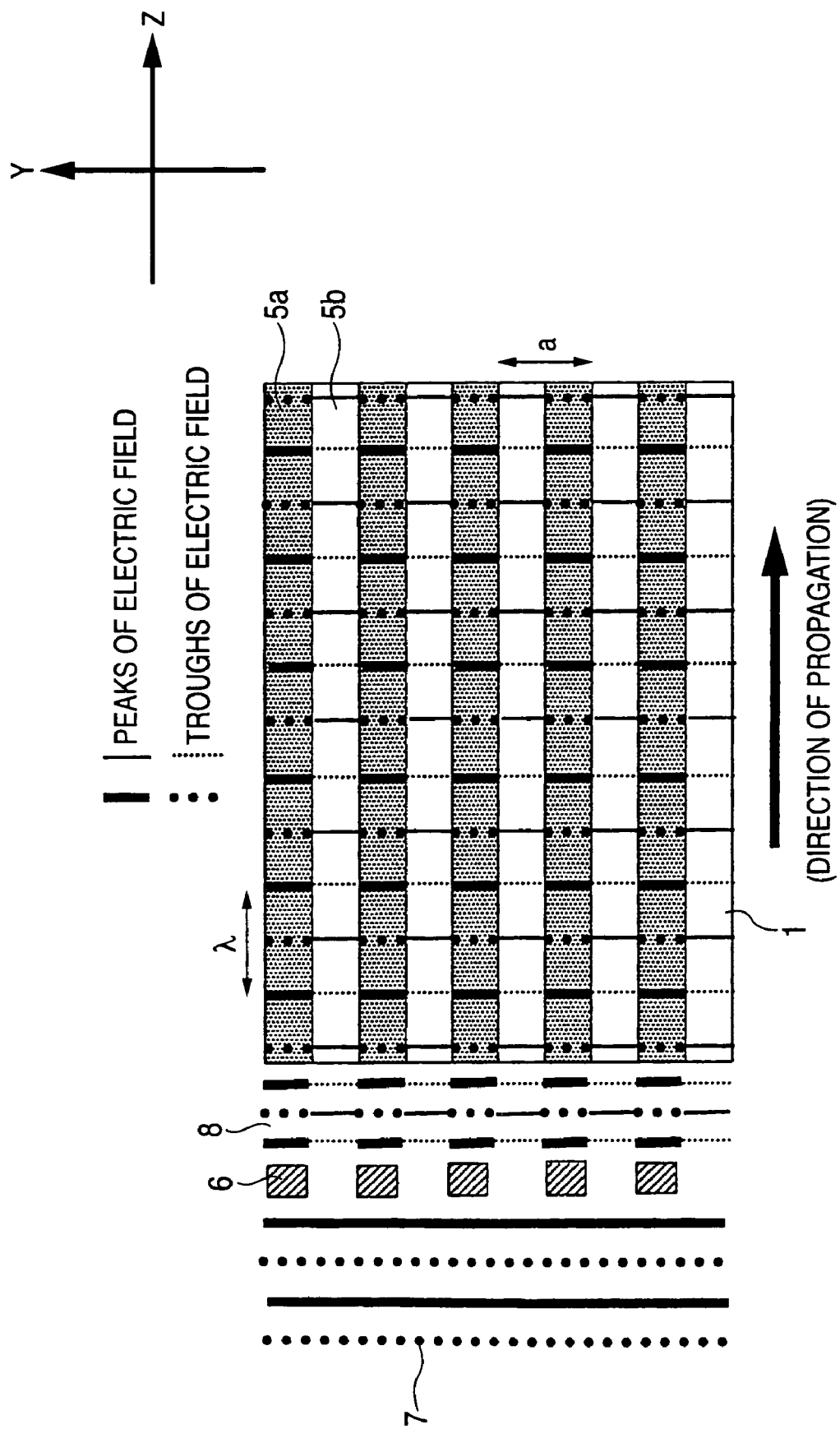
FIG. 7 is a typical view showing light propagating in a periodic multilayer film provided with a phase grating.

Incidentally, when a plane wave 7 is incident onto a phase modulation unit 6 which is provided for generating a difference of about a half wavelength in one period a in the Y-axis direction as shown in FIG. 7, an electric field pattern similar to that of the high-order coupled photonic band in FIG. 6 can be formed in a space 8. From the inventors' simulation, it has become clear that only the high-order propagation band light can be generated without generation of propagated light due to the first photonic band when an end surface of the one-dimensional photonic crystal is disposed in the space 8. The result can be generalized as follows.

"When a suitable phase-modulated wave having a period a in the same direction as the periodic direction of a multilayer film with a period a is incident onto the multilayer film, only propagated light belonging to a specific band can be obtained."

Figure 8:
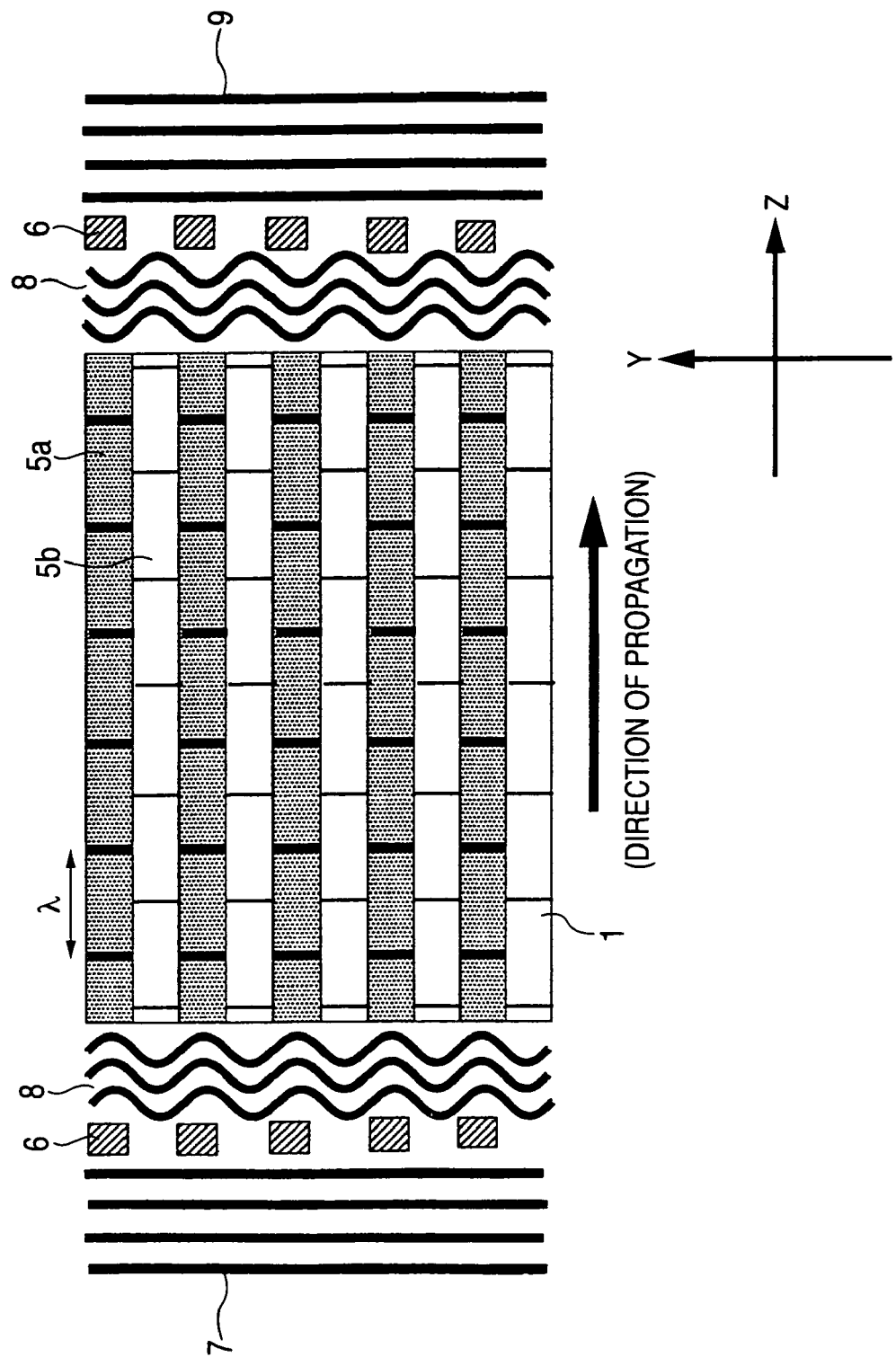
FIG. 8 is a typical view showing the case where phase gratings are provided on an input side and an output side respectively.

If the optical path is assumed to be reversed, it is obvious that propagated light belonging to a specific band can be returned to a plane wave 9 after output from an end surface of the multilayer film 1 when a suitable phase modulation unit 5 is disposed (see FIG. 8).

The condition of the phase modulation unit will be described below specifically.

Figure 9:
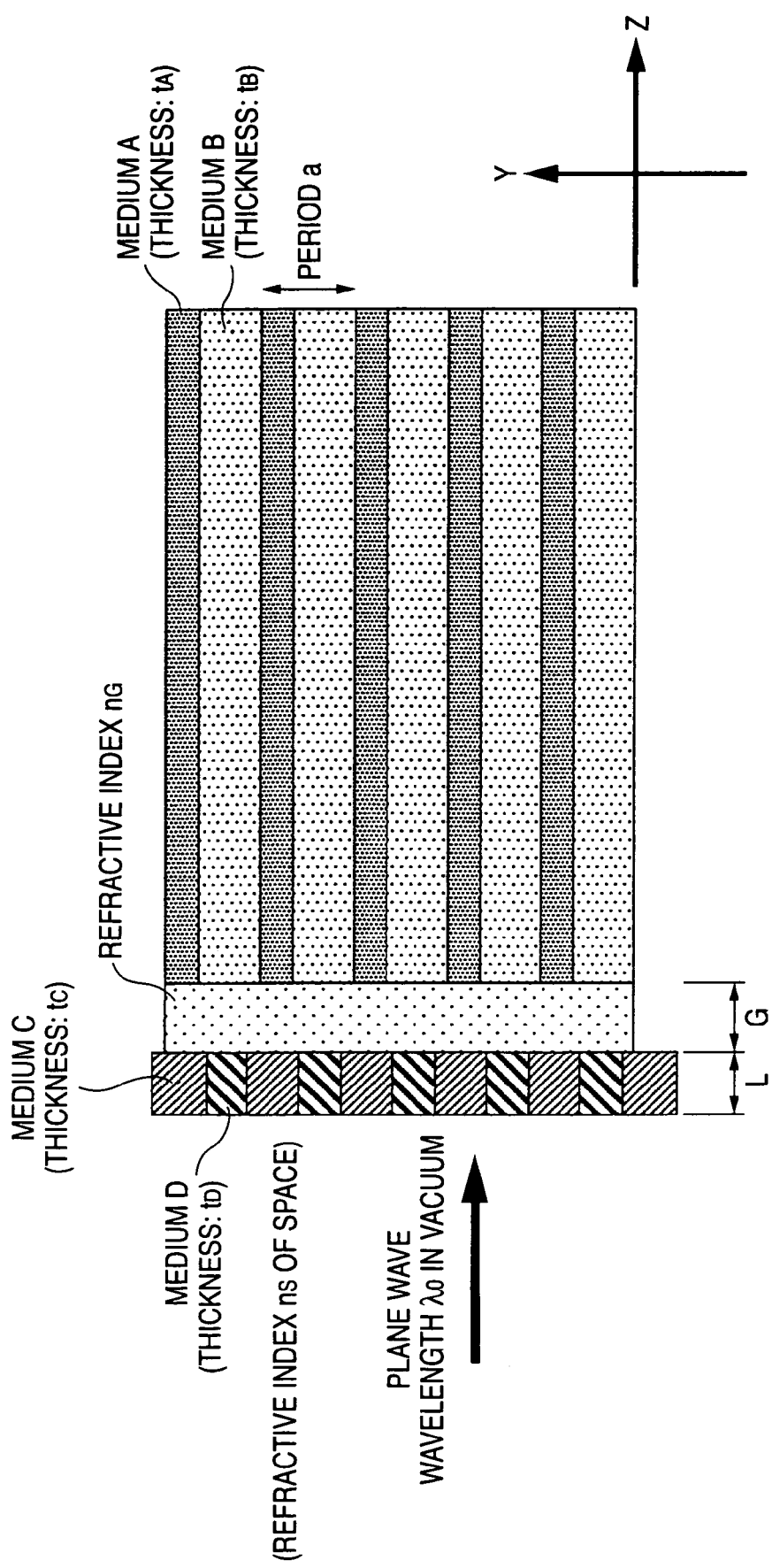
FIG. 9 is a view for explaining parameters of respective portions in the configuration that a phase grating is disposed on an input side.

The simplest phase modulation unit is a phase grating having the same period as that of the periodic multilayer film. For example, the phase grating may be disposed as shown in FIG. 9. According to the inventors' simulation, the structure (thicknesses $t_C$, $t_D$, L, G, etc. in FIG. 9) of the phase modulation unit needs to be optimized in accordance with the characteristic of the periodic multilayer film, that is, in accordance with the thickness ratio of the respective layers, the refractive indices of the respective layers, and so on (see Calculation Examples which will be described later). Furthermore, phase modulation needs to be synchronized with the period of the multilayer film. It is therefore necessary to satisfy the conditions:

(1) $t_A + t_B = t_C + t_n$;

(2) the Y-direction center of the medium A being coincident with that of the medium C; and (3) the Y-direction center of the medium B being coincident with that of the medium D.

The gap G between the phase grating and the periodic multilayer film must be also selected to be in an optimal range because the gap G has influence on propagated light. Further, when the period a of the multilayer film is equal to or smaller than the wavelength $\lambda_0$ of light in a vacuum, the gap G may be preferably filled with a medium high in refractive index so that the phase-modulated wave can be propagated easily.

For carrying out the invention practically, there may be conceived a method in which a groove is formed in a neighbor of an end surface of the periodic multilayer film so that a part of the multilayer film can be directly used as a phase grating. In this case, the thickness of the phase grating and the width of the groove must be adjusted so that only specific high-order propagation band light can be propagated. It is a matter of course that the groove may be provided as an air layer or may be filled with a homogeneous medium.

Figure 10:
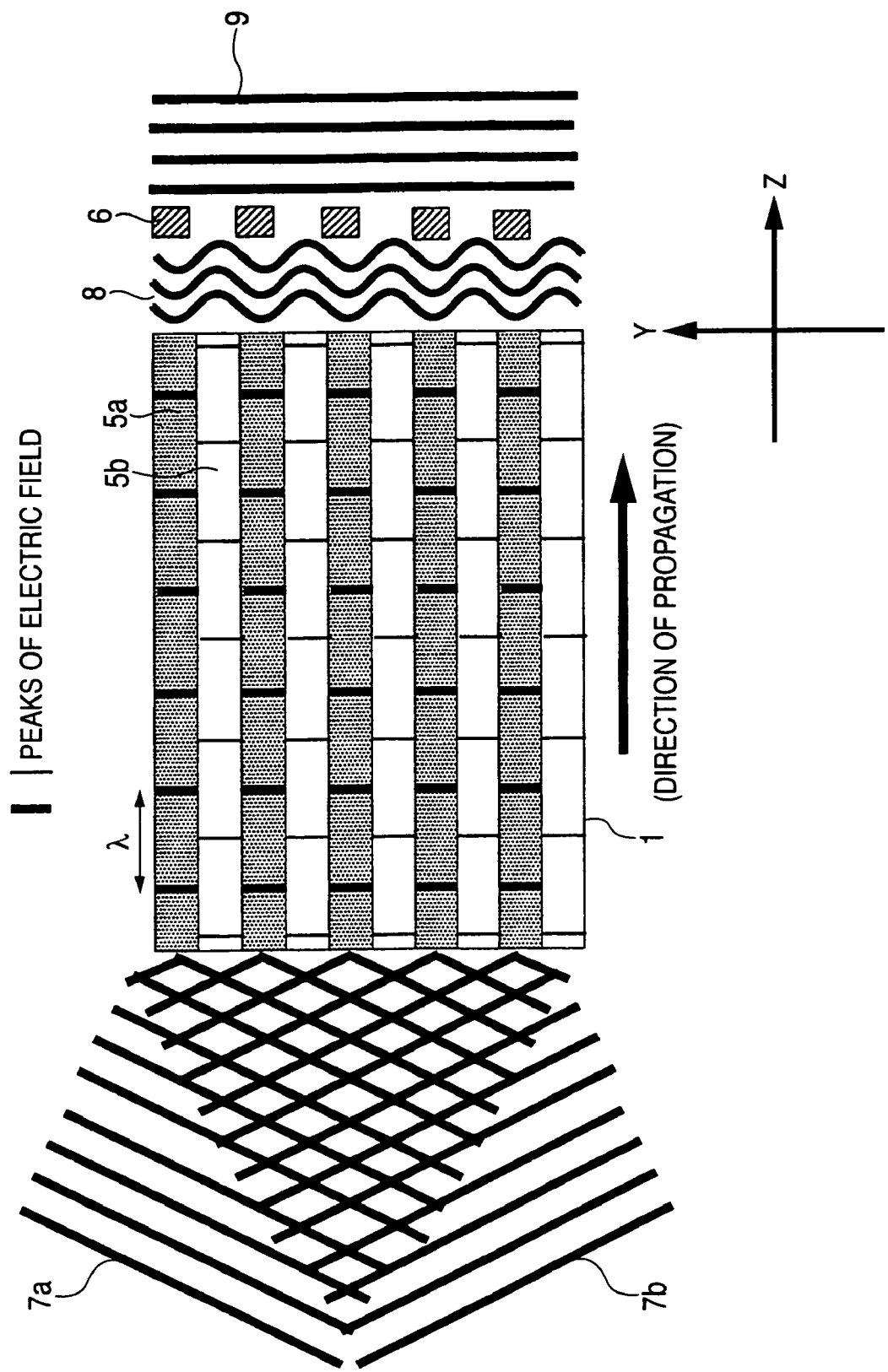
FIG. 10 is a typical view showing the case where a wave obtained by interference of two plane waves is used as input light.

As a method for generating such a phase-modulated wave, there is also a method using interference of a plurality of wave fronts. When two plane waves 7a and 7b coherent to each other are crossed as shown in FIG. 10, a wave similar to the phase-modulated wave can be obtained by interference. The period in the Y-axis direction can be adjusted on the basis of the crossing angle between the two plane waves 7a and 7b.

Figure 11:
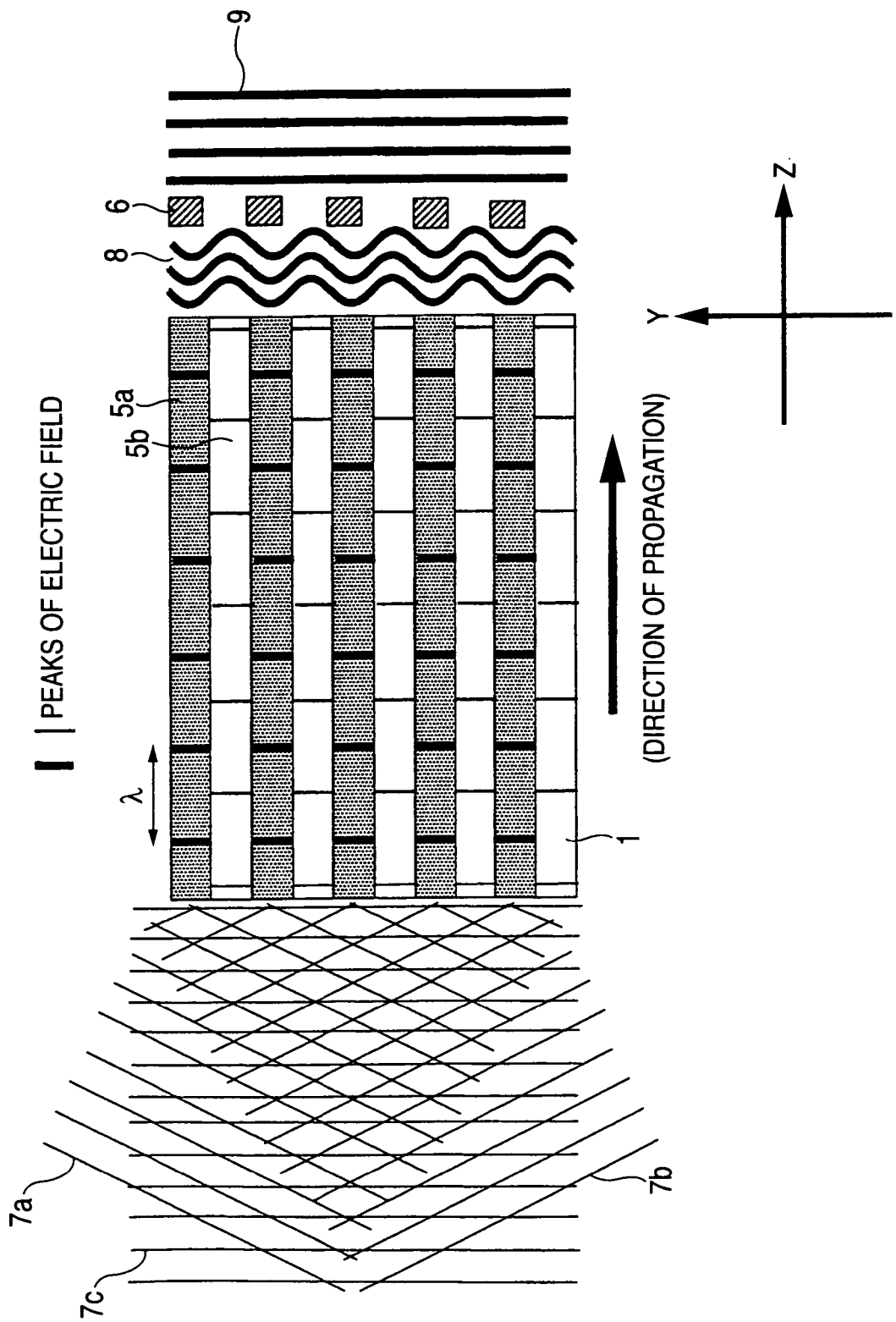
FIG. 11 is a typical view showing the case where a wave obtained by interference of three plane waves is used as input light.

Further, when a third plane wave 7c is added to the two plane waves 7a and 7b as shown in FIG. 11, the phase-modulated wave can be adjusted so finely that the phase-modulated wave can be fitted to the multilayer film well. Because it is difficult to adjust three waves actually, it is obvious that use of interference of two waves as shown in FIG. 10 is easy. In this case, the structure or the periodic multilayer film 1 may be preferably adjusted so that the wave generated by interference of two waves can be matched with the condition of the one-dimensional photonic crystal for propagation of the high-order propagation band light.

As described above, when the effective refractive index in the high-order propagation band light becomes lower than the refractive index of one of the upper and lower media abutting on the multilayer film, propagated light is leaked out by refraction. Particularly when the effective refractive index in the high-order coupled band light becomes equal to or lower than 1, the leakage cannot be prevented even in the case where the medium is air.

Figure 12:
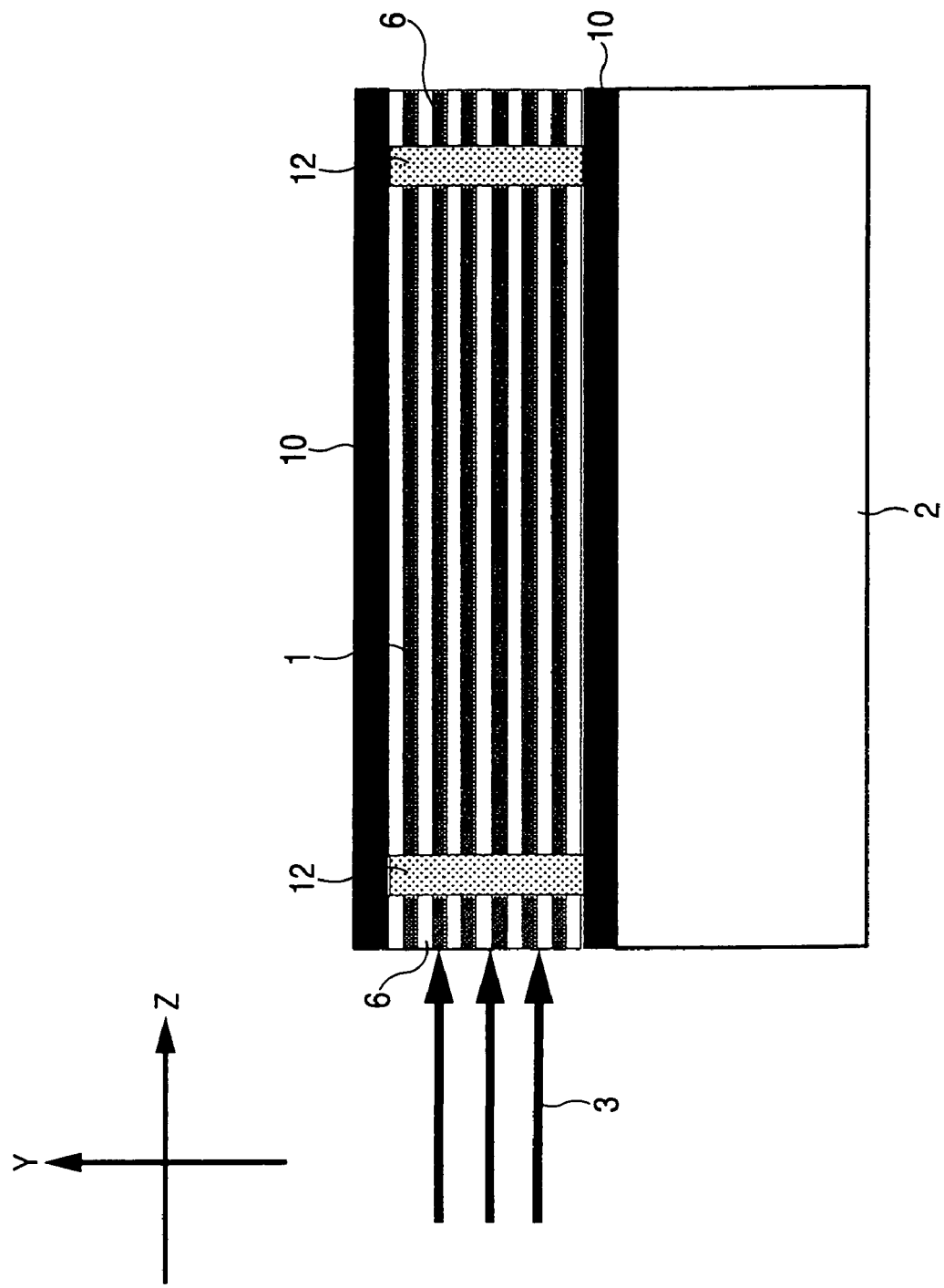
FIG. 12 is a typical view showing a structure in which reflecting layers are provided on opposite surfaces of a multilayer film.
Figure 13:
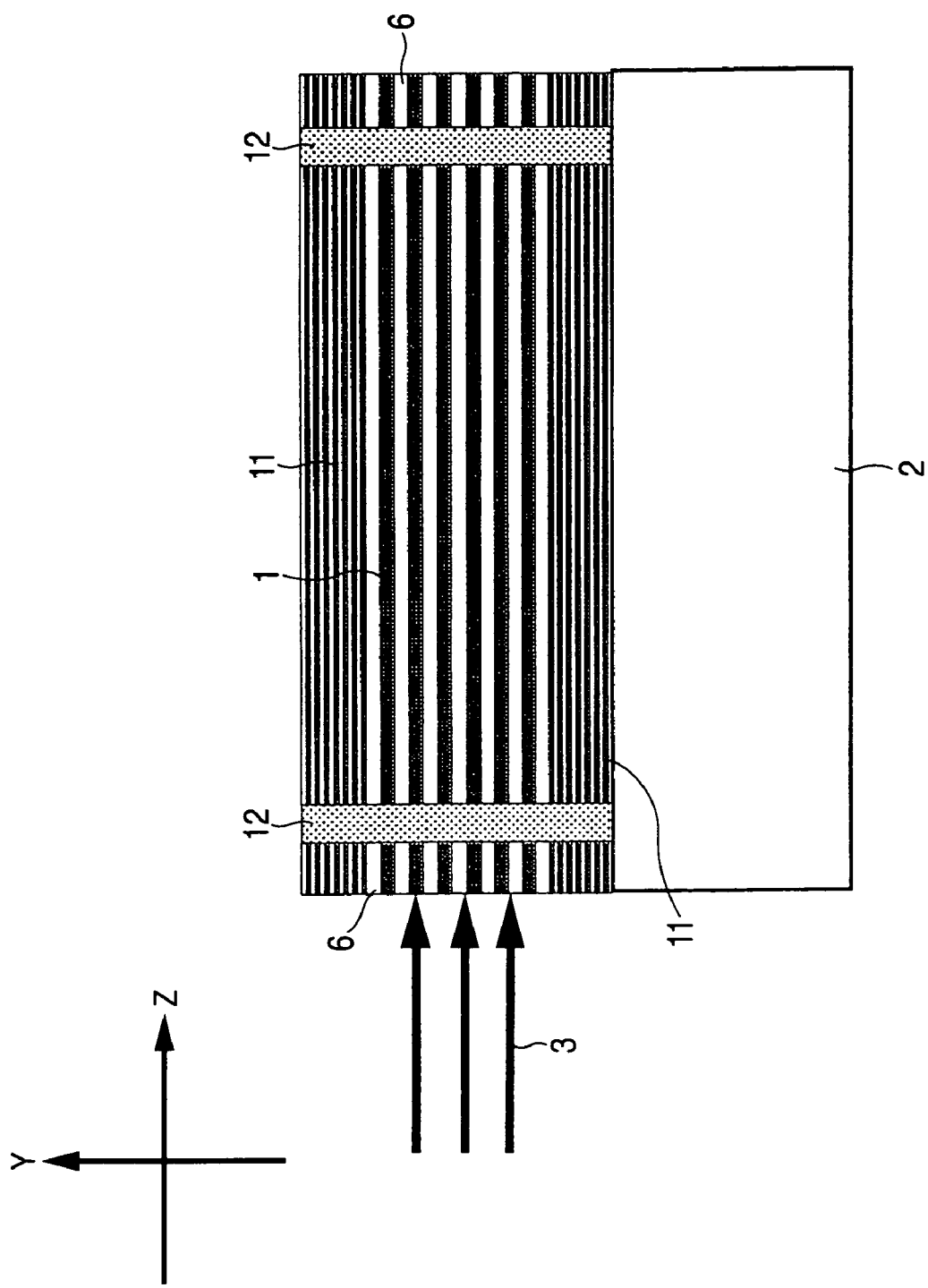
FIG. 13 is a typical view showing a structure in which other multilayer films are provided as reflecting layers on opposite surfaces of a multilayer film.

To confine propagated light while preventing the leakage thereof, as shown in FIG. 12, reflecting layers 10 each of made of a metal film or the like may be provided on upper and lower surfaces of the one-dimensional photonic crystal (multilayer film) 1. If there is however a problem in reduction in strength of the multilayer film due to the reflecting films or attenuation of light due to shortage of reflectance, as shown in FIG. 13, confinement can be achieved by one-dimensional photonic crystals (multilayer films) 11 different in period or structure from the one-dimensional photonic crystal 1.

Figure 14A:
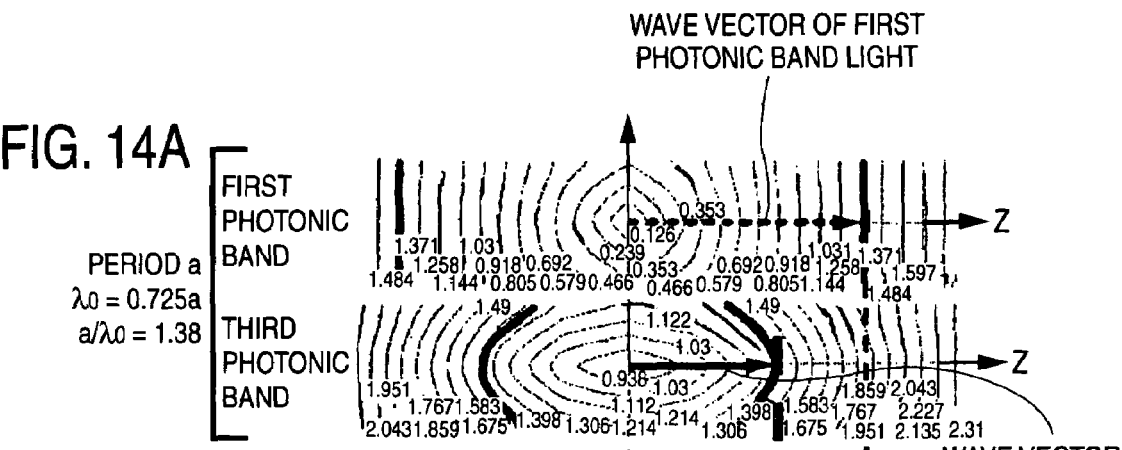
FIGS. 14A and 14B are views for explaining the band condition of the one-dimensional photonic crystals provided for confinement of light.
Figure 14B:
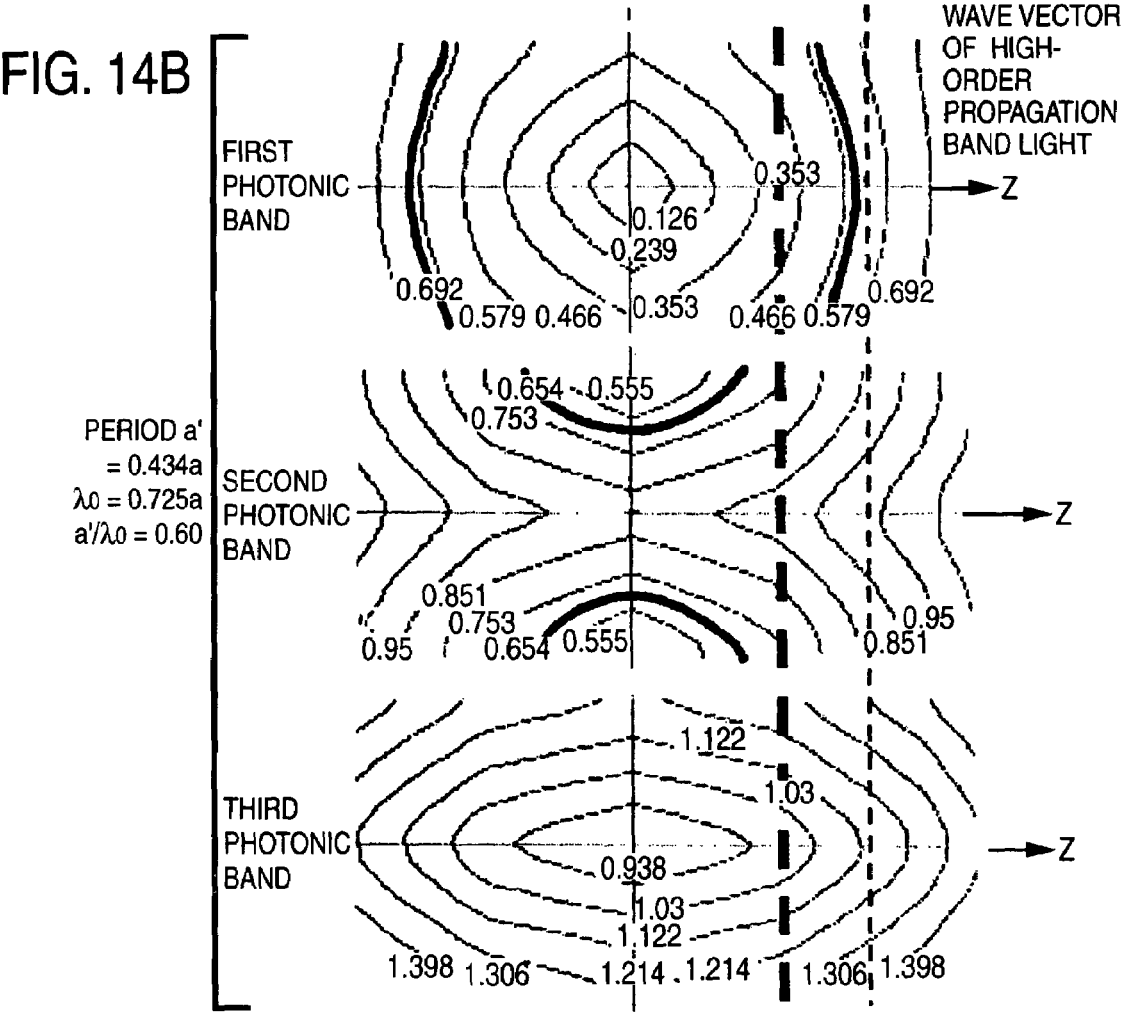

FIGS. 14A and 14B two-dimensionally show band maps of the same scale size about two kinds of periods (period a and period a'=0.434a) in a one-dimensional phonic crystal made of a laminate of alternate two kinds of layers (refractive indices: 1.00 and 1.44) equal in thickness. In each map, the Y-axis direction is taken vertically and upper and lower boundaries indicate a range (first Brillouin zone) of $\pm \pi/a$ (or $\pm \pi/a'$) from the center. In each map, the Z-axis direction (the X-axis direction) is taken horizontally and left and right ends are provided conveniently for indicating a calculated range though there is no Brillouin zone boundary because there is no periodicity it the Z-axis direction. Each position in the Brillouin zone means a wave vector in the photonic crystal. Each contour curve means a band corresponding to a specific normalized frequency $a/\lambda_0$ (or $a'/\lambda_0$). Incidentally, FIGS. 2 and 3 one-dimensionally show only part (plus portion of the Z axis) extracted from the band maps.

In FIG. 14A, the thick line shows a band corresponding to the wavelength $\lambda_0 = 0.725a$ ($a/\lambda_0 = 1.38$) in the one-dimensional photonic crystal with period a, and the arrow shows a wave vector expressing propagated light in the Z-axis direction. In FIG. 14B, the thick line shows a band corresponding to the same wavelength $\lambda_0 = 0.725a$ ($a'/\lambda_0 = 0.60$).

It is obvious from FIGS. 14A and 14B that a band (equal in the Z component) corresponding to the wave vector of the high-order propagation band light is present in FIG. 14A but absent in FIG. 14B. That is, the high-order propagation band light in the crystal with period a cannot go out to the photonic crystal with period a'. Accordingly, if photonic crystals with period a' satisfying this condition are selected and disposed on opposite surfaces of the photonic crystal (with period a) provided for propagation of light, confinement of light can be achieved (see FIG. 13).

The material and thickness ratio of each of the one-dimensional photonic crystals provided for confinement of light may be different from those of the one-dimensional photonic crystal provided for propagation of light. It is however preferable that the same material is used with the period reduced if labor required for producing the multilayer film is considered. It is a matter of course that the absence of the band corresponding to the wave vector of the propagated light in the used wavelength region needs to be confirmed by band calculation before design.

Incidentally, a band corresponding to the first photonic band light is present in FIG. 14A but absent in FIG. 14B. If the period a' and the film structure are adjusted, it is possible to satisfy the condition of "releasing the first photonic band propagation light and confining the high-order propagation band light". Accordingly, it is also possible to remove the first photonic band propagation light completely in the middle of propagation of light.

Because the judgement of the confinement based on the band maps is performed on the assumption that the periodic structure is infinite, there is a possibility that propagated light may leak to the outside because of insufficient confinement if the number of periods in the one-dimensional crystal provided for confinement of light is, for example, about 3. Of course, it is undesirable from the point of view of cost, durability of the multilayer film and accuracy that the number of periods is increased unnecessarily. The minimum number of periods actually required may be preferably decided by experiment or electromagnetic wave simulation.

Figure 15:
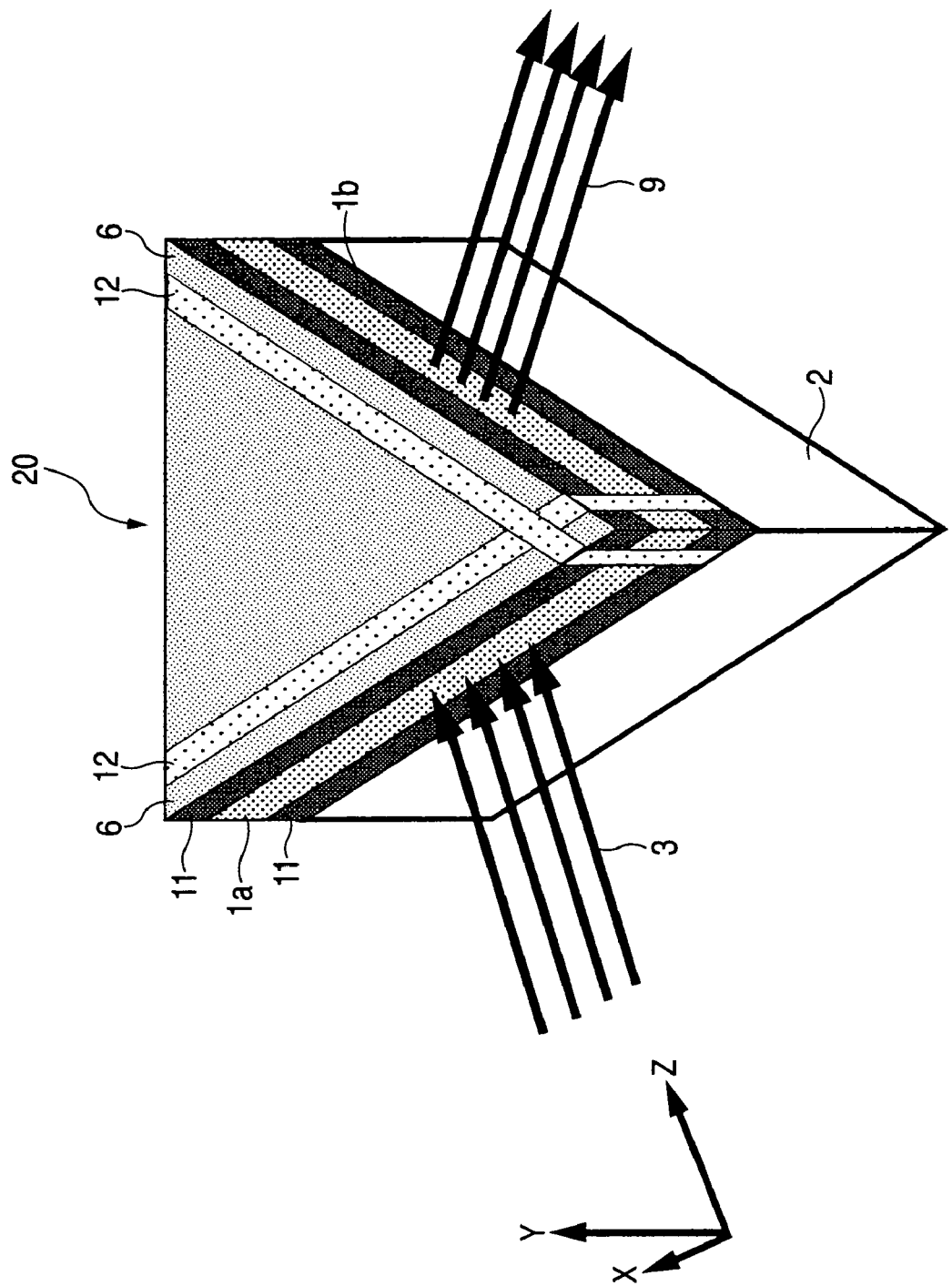
FIG. 15 is a conceptual view of a spectroscopic element using a one-dimensional photonic crystal having a triangular prism structure according to the invention.

FIG. 15 typically shows an example of the spectroscopic element according to the invention as the above description is collected. Two end surfaces of the one-dimensional photonic crystal 20 shaped like a triangular prism are used as a light input end surface 1a and a light output end surface 1b respectively. Grooves 12 are provided near the input and output end surfaces respectively. Accordingly, parts of the photonic crystal are used as phase gratings (phase modulation units) 6 so that propagation of only specific high-order propagation band light and conversion of the light into a plane wave of output light 9 are performed by the phase gratings 6. Two sides of the propagation portion are surrounded by one-dimensional photonic crystals (multilayer films) 11 different in period or structure from the one-dimensional photonic crystal 20, so that propagation light is confined in the Y-axis direction.

The condition to be satisfied by the invention will be described below more specifically.

Though not shown in FIGS. 2 and 3, the fourth or higher-order band exhibits wide wavelength dispersion like the second or third photonic band. As the order of the band of propagation light increases, the number of "nodes" of wave in one period in the Y-axis direction, however, increases to make the pattern of phase modulation more complex. It is therefore most preferable that the second or third photonic band having two nodes per one period is used as the high-order propagation band. Because it is a matter of course that an "uncoupled" band cannot be used, the preferred band is the "second lowest coupled photonic band". As described above, the first photonic band is a coupled photonic band.

Furthermore, because so-called "abnormality of group velocity in photonic crystal" occurs in propagation light due to the high-order propagation band, there is expectation that a function of increasing a nonlinear effect will be exhibited. In the invention, when, for example, a nonlinear substance is contained in the multilayer film, a larger nonlinearity increasing effect can be obtained (Optical Society of Japan, 27$^{th}$ Winter Meeting Document, pp.41–53, 2001) because energy is little consumed by the first photonic band light in which abnormality of group velocity little occurs.

In the periodic multilayer film shown in FIG. 1, because there is a large difference between the structure in the X-axis direction and the structure in the Y-axis direction, the effective refractive index varies according to the direction of polarization. This is also obvious from the fact that the graph in FIG. 2 (TE polarization) is different from the graph in FIG. 3 (TM polarization). Accordingly, the spectroscopic element according to the invention has a function of separating polarization. For example, the spectroscopic element can be used so that separation (demultiplexing) of light according to wavelengths and separation of polarization are performed simultaneously. Accordingly, a function obtained by a combination of a diffraction grating and a polarization separating element can be achieved by a single element, so that a simplified optical system can be provided.

Conversely, it is conceived that a birefringent element for correction is disposed in the middle of the optical path to eliminate the difference between polarization modes. A birefringent crystal, a structural birefringent element, a photonic crystal or the like may be used as the birefringent element.

The materials of the multilayer film used in the invention are not particularly limited if transparency can be secured in the used wavelength region. Materials generally used for the multilayer film and excellent in durability and film-forming cost, such as silica, silicon, titanium oxide, tantalum oxide, niobium oxide and magnesium fluoride, can be used preferably. The multilayer film can be easily formed from these materials by a well-known method such as sputtering, vacuum vapor deposition, ion assisted deposition or plasma CVD.

Because there is a tendency for wavelength dispersion to increase as the refractive index ratio of the multilayer film materials increases, a high-refractive-index material and a low-refractive-index material may be preferably combined as the multilayer film materials when wide wavelength dispersion is required. When, for example, air (refractive index: 1) is used as the low-refractive-index material and InSb (refractive index n=4.21) is used as the high-refractive-index material, a value of 4 or more can be obtained as the practically achievable refractive index ratio (see "Bishoukougaku Handbook" p.224, ASAKURA Shoten, 1995).

Because the characteristic difference according to the direction of polarization is apt to decrease as the refractive index ratio of the multilayer film materials decreases, a combination small in refractive index ratio is also useful for achieving polarization independence. Incidentally, it is preferable that a value of 1.2 or more is secured as the refractive index ratio because there is a possibility that the expected function cannot be fulfilled when the refractive index ratio is so small that the modulating function is weakened.

After lamination of the multilayer film, the groove to be provided near an end surface of the multilayer film can be formed by a general method including the steps of: applying a resist layer; patterning; etching; and removing the resist layer. Air or vacuum may be used as the low-refractive-index material in the groove portion or the groove may be filled with another medium (filler substance). An organic resin, a sol-state glass material, a molten semiconductor material or the like can be used as the filler substance. The sol-state glass material may be gelated and then heated to be provided as transparent glass.

If materials are selected appropriately, the function of the invention can be fulfilled in a wavelength range of from about 200 nm to about 20 μm used generally.

The simplest structure of the multilayer film is in the case where two layers equal in physical thickness are provided in one period in the Y-axis direction. Improvement in dispersion and polarizing characteristic and improvement in efficiency in use of input light can be assisted when the average refractive index and the band structure are adjusted by the following methods: (1) a method for changing the thickness ratio between the two layers; (2) a method for providing three or more layers; or (3) a method for providing three or more kinds of film materials.

Even in the case where each of layers constituting the multilayer film has a refractive index changing continuously, the characteristic of the multilayer film can be substantially kept constant if the refractive index difference is kept constant.

The material of the substrate for the multilayer film is not particularly limited. Examples of the material preferably used are soda lime glass, optical glass, silica, silicon, and compound semiconductor such as gallium arsenide. It limitation due to temperature characteristic or the like is little, a plastic material may be used as the substrate material.

A so-called air bridge structure composed of only the multilayer film without use of any substrate may be used.

[Applied Example; Demultiplexing/Multiplexing Element]

Figure 16:
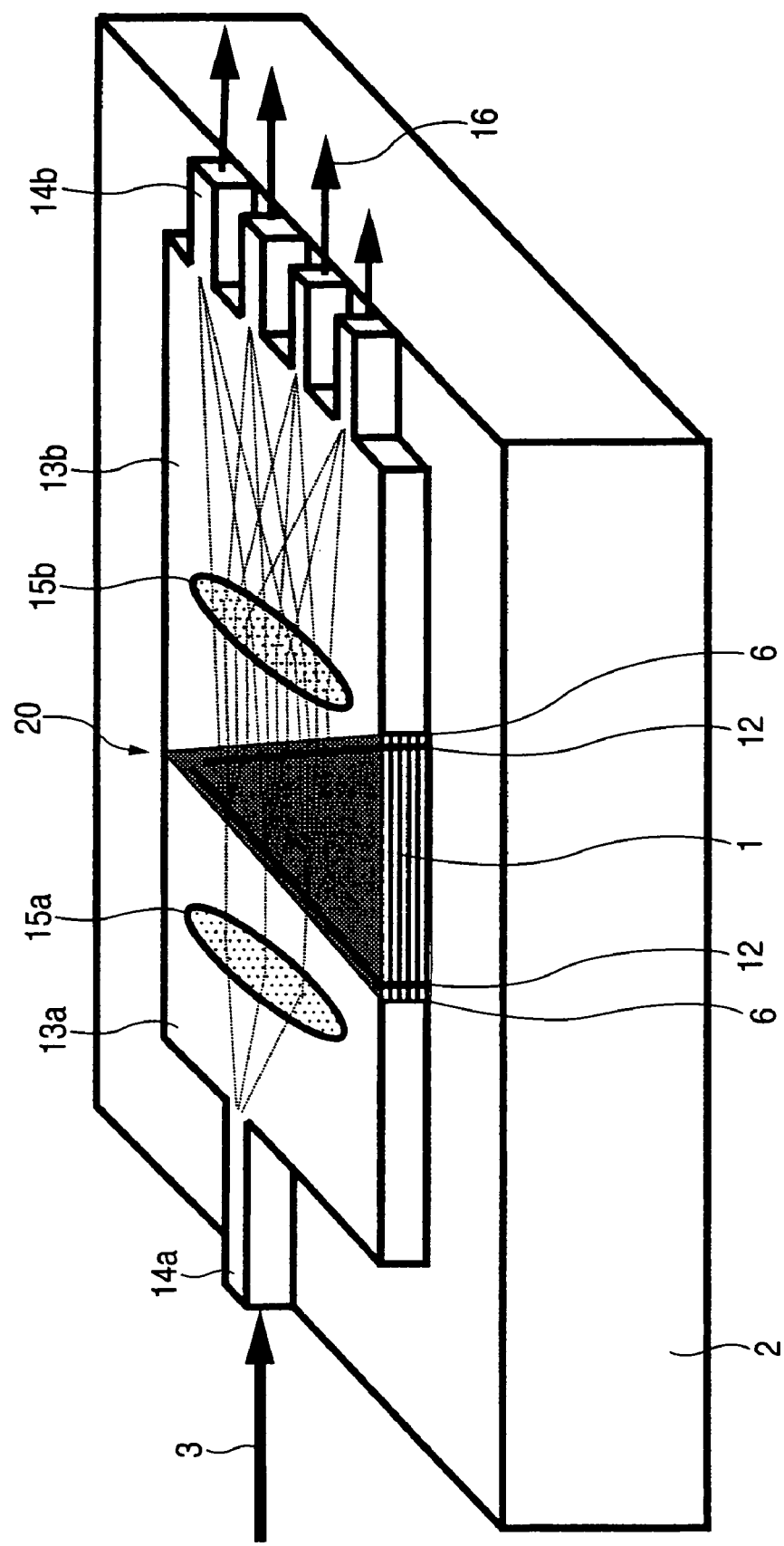
FIG. 16 is a typical view showing a waveguide type demultiplexing/multiplexing element using a triangular prism-shaped one-dimensional photonic crystal according to the invention.

FIG. 16 is a typical view of a demultiplexing element as an applied example of the invention. Input light (incident light flux) 3 containing an optical signal with a plurality of wavelengths is introduced from a first linear optical waveguide 14a formed on a substrate 2 to a slab optical waveguide 13a. In the structure shown in FIG. 16, it is practical that an optical fiber or the like is connected to a start end or the linear optical waveguide 14a. Alternatively, an optical fiber or the like may be directly connected to an end surface to the slab optical waveguide 13a. Because the optical signal spreads planarly in the slab optical waveguide 13a, the optical signal is converted into nearly parallel light flux by a convex lens portion 15a provided in the slab optical waveguide. When, for example, a part of the slab optical waveguide 13a is replaced by a material having a higher refractive index, the convex lens portion 15a can be achieved. The same condensing effect can be also obtained when a material having a lower refractive index is formed into a concave lens shape.

The optical signal is obliquely input to a one-dimensional photonic crystal (periodic multilayer film) 20 having a triangular prism structure, in the same plane as the slab optical waveguide 13a. A groove 12 is provided near an input side end surface of the periodic multilayer film 1, so that a portion on the outside of the groove serves as a phase grating 6. After phase-modulated by the phase grating 6, the optical signal is input to a body of the periodic multilayer film 1 through the groove 12. Accordingly, the optical signal is propagated as high-order coupled photonic band light in the multilayer film. Though not shown in FIG. 16, layers different in period from the multilayer film are provided on upper and lower surfaces of the multilayer film so that light is confined between the upper and lower surfaces of the multilayer film. Because the high-order propagation band light exhibits very large wavelength dispersion, the optical signal having passed through the prism-shaped multilayer film is separated into pencils of light rays according to wavelengths so that the pencils of light rays are output.

A groove 12 is provided in an output side end surface of the multilayer film in the same manner as in the input side. Accordingly, the high-order propagation band light is converted into a plane wave, so that the plane wave is input to a second slab optical waveguide 13b. A convex lens portion 15b is also provided in the second slab optical waveguide 13b. Accordingly, optical signals 16 are condensed according to the wavelengths and output from terminal ends of linear optical waveguides 14b to optical fibers or the like.

FIG. 16 shows an example of the demultiplexing element. If the input side and the output side are replaced by each other, the element shown in FIG. 16 can be used as a multiplexing element.

Figure 17:
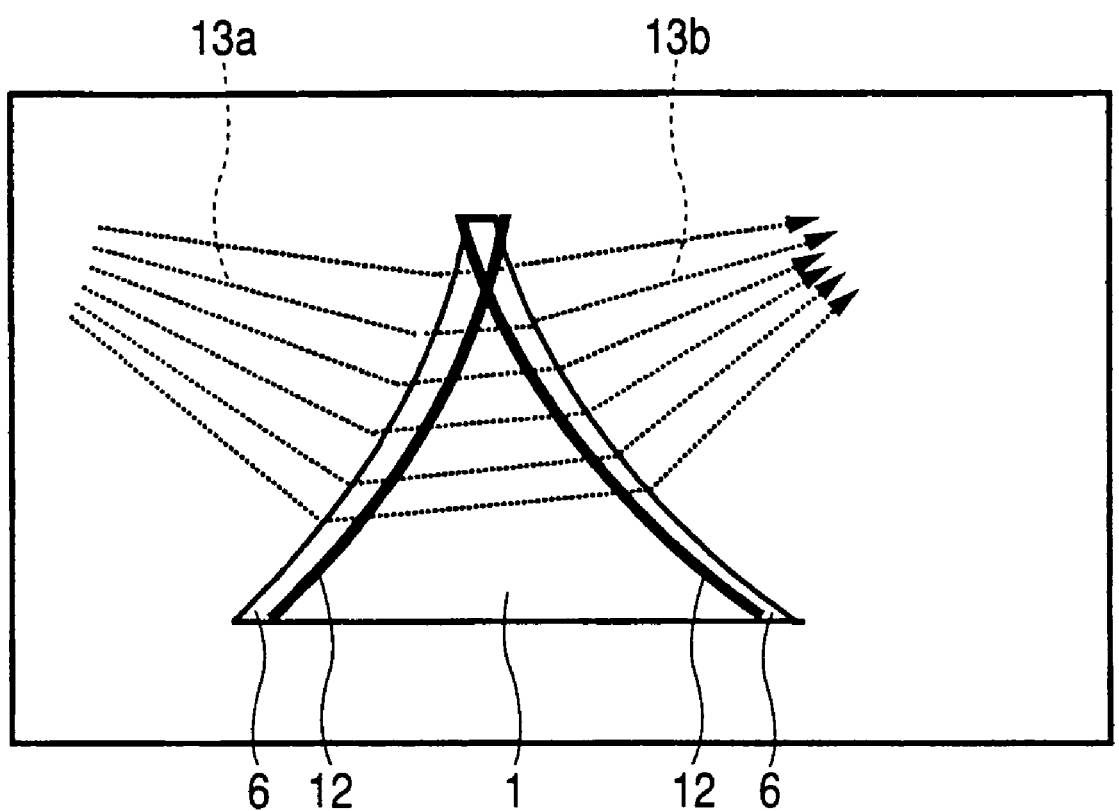
FIG. 17 shows an example in which each boundary surface between the one-dimensional photonic crystal and a slab waveguide is formed as a curved surface.

The condensing function of each of the convex lens portions 15a and 15b may be achieved by another method. Examples of the method include:

(1) providing a diffraction lens in the slab waveguide; and (2) forming the boundary surface between the multilayer structure and the slab waveguide as a curved surface to thereby provide a lens function (FIG. 17).

CALCULATION EXAMPLES (1) Simulation of Refracted Light

Electromagnetic wave simulation for propagation of light in the inside of a one-dimensional photonic crystal prism combined with a phase grating is performed by an FDTD (Finite Difference Time Domain) method. A software program used is JMAG made by The Japan Research Institute, Limited.

FIG. 18 shows a calculation model. The one-dimensional photonic crystal has a structure in which layers of a homogeneous medium A and layers of a homogeneous medium B are laminated alternately (only one period is shown in FIG. 18). Let a be one period in the multilayer film. Let $t_A$ and $t_B$ be the thickness of one medium A layer and the thickness of one medium B layer respectively. Let $n_A$ and $n_B$ be the refractive indices of the media A and B respectively. Grooves each having a width of G are disposed so as to be far by a distance of L from two side surfaces of the prism, so that phase gratings are formed. The refractive index of the groove portion is $n_G$.

The vertical angle of the prism is $\theta_P$. A plane wave with wavelength $\lambda_0$ is continuously input to a side surface of the prism. The width of the input light flux is W. The incident angle of the input light flux is $\theta_0$. A space with a refractive index of $n_S$ is provided on the outside of the prism. Although the range of calculation is one period in the Y-axis direction, calculation is equivalent to that in the infinite periodic structure in the Y-axis direction because the periodic boundary condition is decided. In the following Calculation Examples and Comparative Examples, all lengths are standardized on the basis of the period a.

(2) Simulation of Confinement in Y-axis Direction

Simulation is performed in the case where light is confined in the Y-axis direction by one-dimensional photonic crystals different in period or structure as shown in FIG. 13. The calculation model of the periodic multilayer film portion is the same as shown in FIG. 18 except that the incident angle $\theta_0$ is zero. Because each one-dimensional photonic crystal is homogeneous in the X-axis and Z-axis directions, a sufficient result can be obtained if simulation is performed in the Y-Z plane.

(3) Correction of Phase Grating Width and Groove Width

Although it is preferable that the phase grating in the invention has a thickness adequate to generate an optical path length difference of about a half wavelength, it is necessary to optimize specific numerical values inclusive of the thickness and refractive index of the groove portion by electromagnetic wave simulation. For example, the optimization is performed by the following procedure.

(1) Optimal values $L_0$ and $G_0$ are decided by simulation of the structure shown in FIG. 19A in the Y-Z plane in the condition that the incident angle $\theta_0$ is zero.

(2) The value of $L_0$ is converted into an optimal value L' at a general incident angle $\theta_0$ from a region having a refractive index of 1. The equation of conversion for calculating L' can be obtained on the basis of the relational expressions shown in FIG. 19B on the assumption that the optical path length difference in FIG. 19B is equal to that in FIG. 19A. That is, because the two optical path length differences are equal to each other, the following equation can be obtained.

$$L_0(n_B - n_A) = P2 + P3 - P1$$

This equation can be transformed as follows.

$$L'=L_0(n_B-n_A)/\{(n_B^2-\sin^2\theta_0)^{0.5}-(n_A^2-\sin^2\theta_0)^{0.5}\}$$

The equation of conversion for calculating G' can be simply obtained as follows.

$$G'=G_0\{1-(\sin\theta_0/n_G)^2\}^{0.5}$$

Calculation Example 1-1

Figure 20:
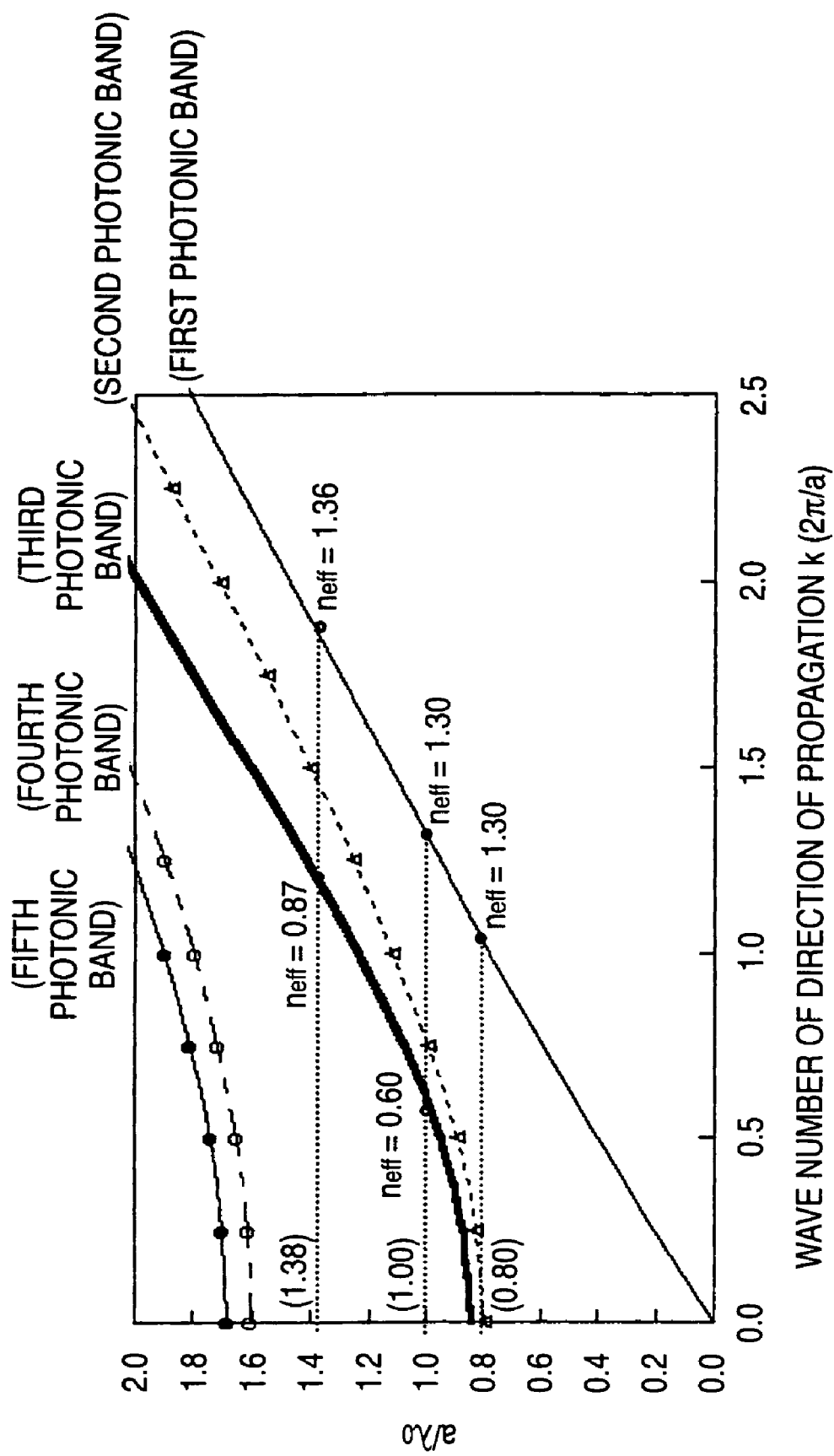
FIG. 20 is a graph showing band charts of the one-dimensional photonic crystal and the effective refractive index thereof according to each band charts.

Simulation or refracted light with respect to light flux obliquely incident onto the one-dimensional photonic crystal was performed in the following condition in the case where no phase grating was provided.
(Periodic Structure)
period: a
(Medium A)
thickness: $t_A=0.5a$
refractive index: $n_A=1.00$
(Medium B)
thickness: $t_B=0.5a$
refractive index: $n_B=1.44$
(Ambient Space)
refractive index: $n_S=1.00$
(Incident Light)
wavelength: $\lambda_0=0.725a$ ($a/\lambda_0=1.38$)
polarization: TE polarization (the direction of electric field was the X-axis direction)
light flux width; W=5.66a
incident angle: $\theta_0=30°$ FIG. 20 shows photonic band charts (TE polarization) of the one-dimensional photonic crystal in the aforementioned condition. Effective refractive indices $n_{eff}$ of respective bands in accordance with $a/\lambda_0=1.38$ can be found from FIG. 20.

The effective refractive index of the first photonic band: $n_{eff}=1.36$

Figure 21A:
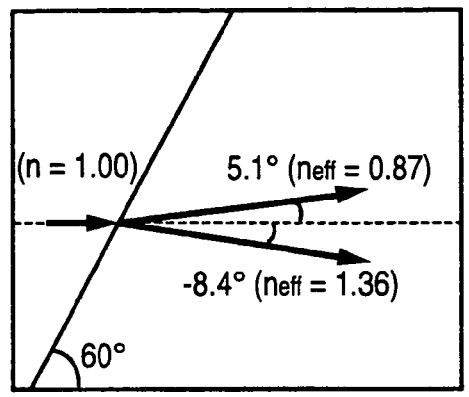
FIGS. 21A to 21C are views showing a result of electromagnetic wave simulation of refracted light with respect to light obliquely incident onto the one-dimensional photonic crystal (in the case where no phase grating is provided)

The effective refractive index of the high-order propagation band (third photonic band): $n_{eff}=0.87$ FIG. 21A shows the direction of refracted light calculated in the prism structure by the laws of refraction on the basis of these effective refractive indices.

Figure 21B:
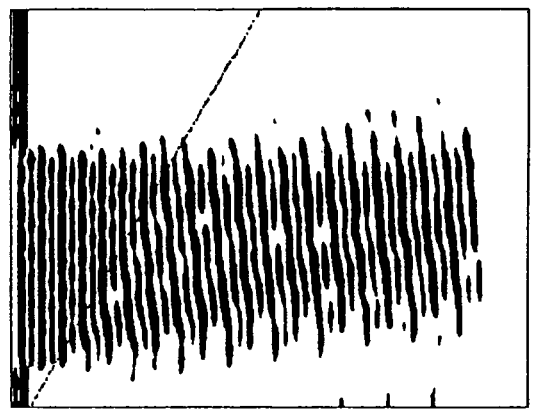
Figure 21C:
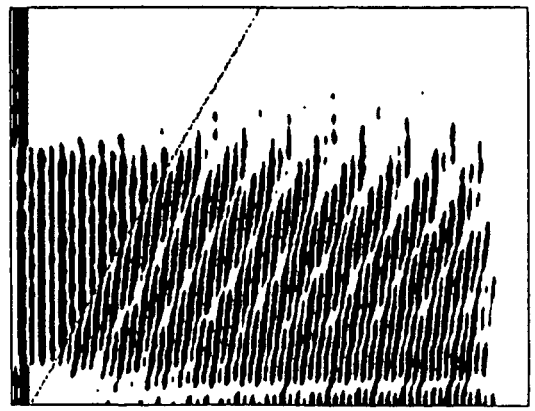

FIGS. 21B and 21C show electric field intensity distributions in a "plane at the center of the medium A" and a "plane at the center of the medium B" as a result of FDTD simulation. Because wave long in wavelength due to the high-order propagation band holds a dominant position in the medium A low in refractive index whereas wave short in wavelength due to the first photonic band holds a dominant position in the medium B high in refractive index, the directions of the two propagation light rays can be compared with each other.

It is obvious that the directions of propagation light rays due to the bands are well coincident with angles of refraction (FIG. 21A) calculated on the basis of the effective refractive indices respectively.

Calculation Example 1-2

Simulation of confinement of light in the Y-axis direction was performed in a condition corresponding to Calculation Example 1-1.

The structure of the one-dimensional photonic crystal for guiding wave and the wavelength and polarization of incident light were equal to those in Calculation Example 1-1.

The thickness of the phase grating and the thickness of the groove portion were optimized on the assumption that the incident angle $\theta_0$ was zero.
(Phase Grating)
thickness: L=0.803a
(Groove)
width: G=1.075a
refractive index: $n_G=1.00$ The structure of the confinement portion was as follows.
(Confinement Layer)
period: a'=0.434a The refractive indices of respective layers in the confinement portion and the thickness ratio thereof were equal to those on the waveguide portion.
(Ambient Space)
refractive index: $n_0=1.00$
(Incident Light)
Y-axis direction light flux width: 2W'=16a The waveguide portion was formed to have 20 periods. Confinement layers each having 10 periods were disposed on upper and lower surfaces of the waveguide portion. Because this structure was centrosymmetric, only an upper half of the structure was subjected to calculation.

FIG. 22 shows a result (electric field intensity distribution) of simulation of confinement of light in the Y-axis direction. It is obvious that propagation light due to the high-order band in the one-dimensional photonic crystal portion for guiding wave is confined in the Y-axis direction so as not to leak to the outside.

Calculation Example 1-3

Calculation Example 1-3 is the same as Calculation Example 1-2 except the period in each confinement layer.
(Confinement Portion)
period: a'=0.905a FIG. 23 shows a result (electric field intensity distribution) of simulation of confinement of light in the Y-axis direction. It is obvious that propagation light due to the high-order band in the one-dimensional photonic crystal portion for guiding wave is confined in the Y-axis direction so as not to leak to the outside.

Calculation Example 2-1

In the condition of Calculation Example 1-1, the wavelength of incident light was changed.
(Incident Light)
wavelength: $\lambda_0=1.0a$ ($a/\lambda_0=1.00$)

FIG. 20 shows band charts (TE polarization) of the one-dimensional photonic crystal in this condition. Effective refractive indices $n_{eff}$ of respective bands in accordance with $a/\lambda_0=1.00$ can be found from FIG. 20.

The effective refractive index of the first photonic band: $n_{eff}=1.30$

Figure 24A:
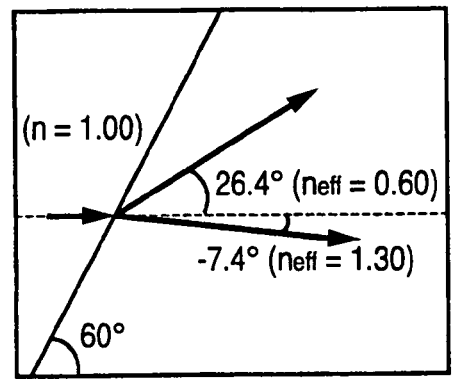
FIGS. 24A to 24C are views showing a result of another electromagnetic wave simulation of refracted light with respect to light obliquely incident onto the one-dimensional photonic crystal (in the case where no phase grating is provided)

The effective refractive index of the high-order propagation band (third photonic band): $n_{eff}=0.60$ FIG. 24A shows the direction of refracted light calculated in the prism structure by the laws of refraction on the basis or these effective refractive indices.

Figure 24B:
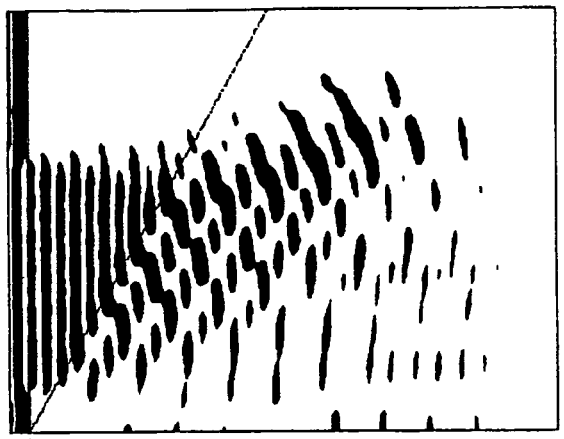
Figure 24C:
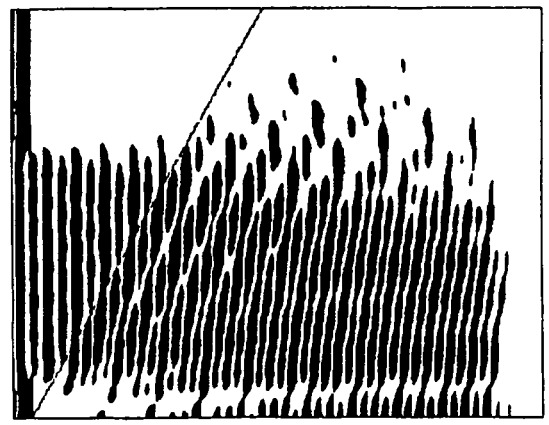

FIGS. 24B and 24C show electric field intensity distributions in a "plane at the center of the medium A" and a "plane at the center of the medium B" as a result of FDTD simulation. It is obvious that the directions of propagation light rays due to the bands are well coincident with angles of refraction (FIG. 24A) calculated on the basis of the effective refractive indices respectively. Although the angle of refraction of the first photonic band light little changes, the angle of refraction of the high-order band propagation light changes greatly compared with Calculation Example 1-1.

Calculation Example 2-2

Figure 25A:
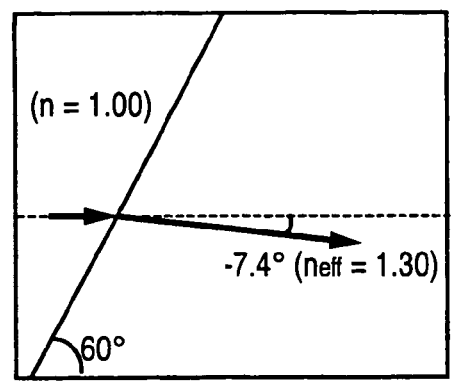
FIGS. 25A to 25C are views showing a result of another electromagnetic wave simulation of refracted light with respect to light obliquely incident onto the one-dimensional photonic crystal (in the case where no phase grating is provided)
Figure 25B:
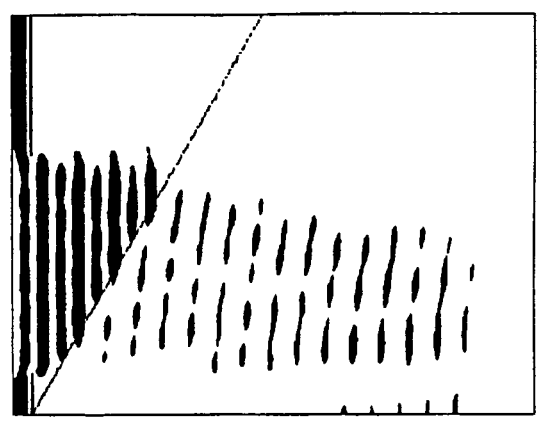
Figure 25C:
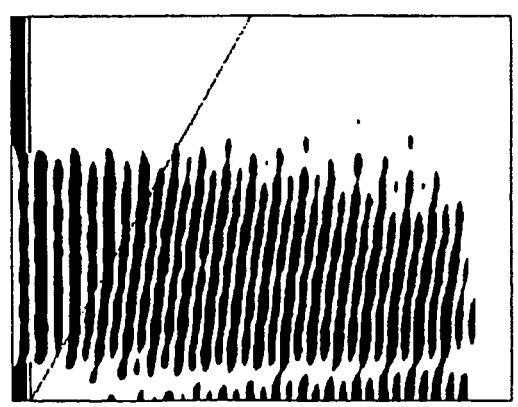

In the condition of Calculation Example 1-1, the wavelength of incident light was changed.
(Incident Light)
wavelength: $\lambda_0=1.25a$ $(a/\lambda_0=0.80)$
FIG. 20 shows band charts (TE polarization) of the one-dimensional photonic crystal in this condition. Effective refractive indices $n_{eff}$ of respective bands in accordance with $a/\lambda_0=0.80$ can be found from FIG. 20.
The effective refractive index of the first photonic band: $n_{eff}=1.30$
The high-order propagation band (third photonic band): none
FIG. 25A shows the direction of refracted light calculated in the prism structure by the Snell's law of refraction on the basis of these effective refractive indices.
FIGS. 25B and 25C show electric field intensity distributions in a "plane at the center of the medium A" and a "plane at the center of the medium B" as a result of FDTD simulation. Because the high-order propagation band light is absent for the given wavelength, only the first photonic band light appears in each layer.

Calculation Example 3-1

Figure 26A:
FIGS. 26A and 26B are views showing a result of electromagnetic wave simulation of refracted light with respect to light obliquely incident onto the one-dimensional photonic crystal (in the case where phase gratings are provided)
Figure 26B:
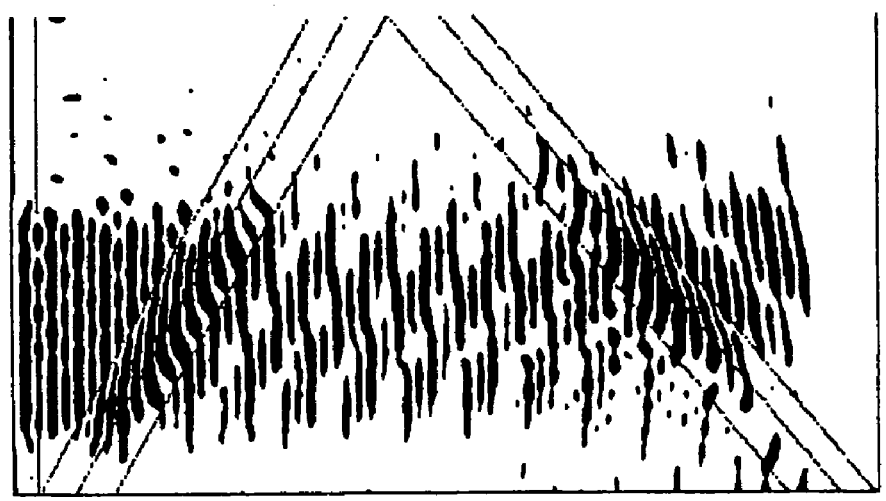

In addition to the configuration used in Calculation Example 1-1, phase gratings each having a groove structure were formed in the input and output end surfaces respectively
(Periodic Structure)
period: a
vertical angle: $\theta_P=70.16°$
(Medium A)
thickness: $t_A=0.5a$
refractive index; $n_A=1.00$
(Medium B)
thickness: $t_B=0.5a$
refractive index: $n_B=1.44$
(Ambient Space)
refractive index; $n_S=1.00$
(Phase Grating)
thickness: $L=0.730a$
(Groove)
width: $G=0.931a$
refractive index: $n_G=1.00$
(Incident Light)
wavelength: $\lambda_0=0.609a$ $(a/\lambda_0=1.45)$
polarization: TE polarization (the direction of electric field was the X-axis direction)
light flux width: $W=5.66a$
incident angle: $\theta_0=30°$
FIGS. 26A and 26B show electric field intensity distributions in a "plane at the center of the medium A" and a "plane at the center of the medium B" as a result of FDTD simulation. In each layer, only the high-order propagation band light propagates in a large part of the one-dimensional photonic crystal portion. It is obvious that output light is formed as light near to a plane wave.

It can be found from FIG. 26A that the vectorial angle of output light is 8.5°.

Calculation Example 3-2

Figure 27A:
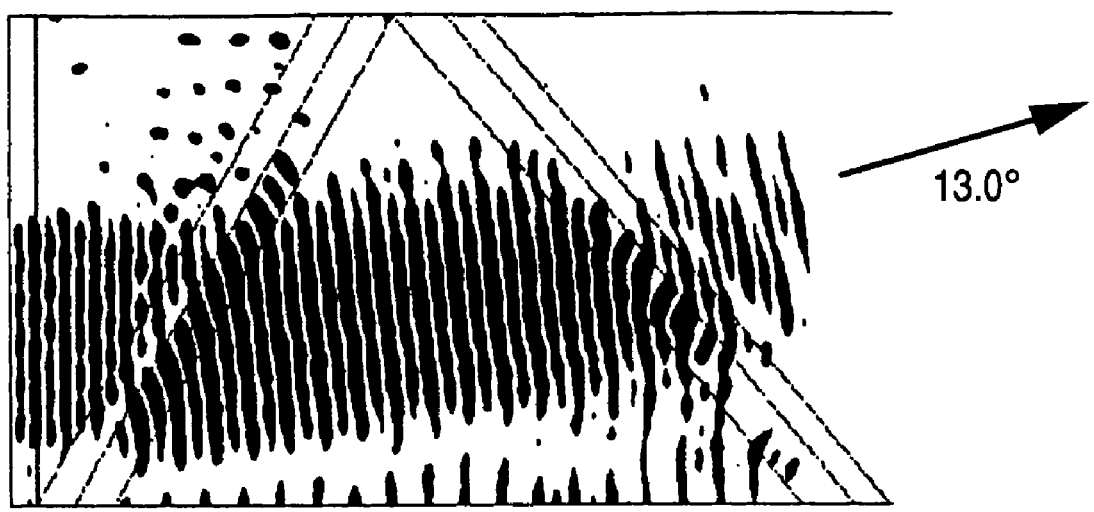
FIGS. 27A and 27B are views showing a result of another electromagnetic wave simulation of refracted light with respect to light obliquely incident onto the one-dimensional photonic crystal (in the case where phase gratings are provided)
Figure 27B:
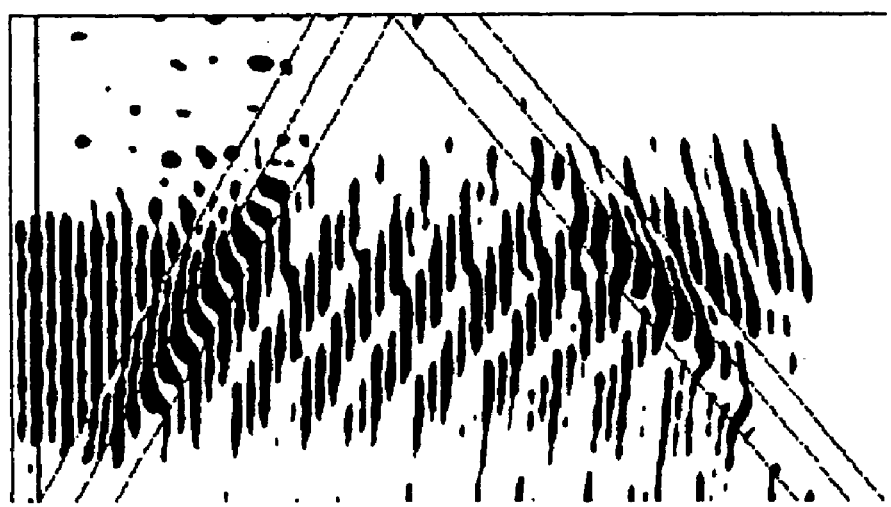

In the condition used in Calculation Example 3-1, only the wavelength of incident light was changed.
(Incident Light)
wavelength; $\lambda_0=0.760a$ $(a/\lambda_0=1.32)$
polarization: TE polarization (the direction of electric field was the X-axis direction)
FIGS. 27A and 27B show electric field intensity distributions in a "plane at the center of the medium A" and a "plane at the center of the medium B" as a result of FDTD simulation. In each layer, only the high-order propagation band light propagates in a large part of the one-dimensional photonic crystal portion. It is obvious that output light is formed as light near to a plane wave.

It can be found from FIG. 27A that the vectorial angle of output light is 13.0°.

It is obvious from Calculation Examples 3-1 and 3-2 that good plane wave-shaped output light exhibiting wide wavelength dispersion in a wide wavelength region can be obtained by the triangular prism structure according to the invention.

Calculation Example 4-1

Figure 28A:
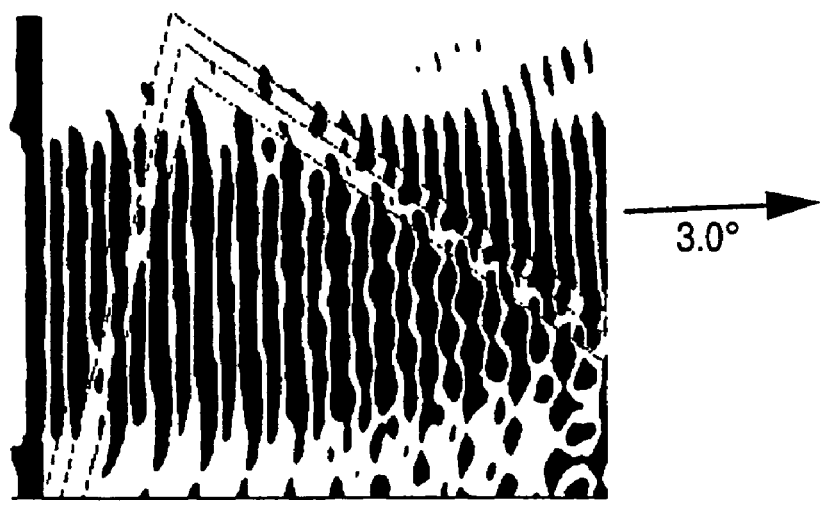
FIGS. 28A and 28B are views showing a result of another electromagnetic wave simulation of refracted light with respect to light obliquely incident onto the one-dimensional photonic crystal (in the case where phase gratings are provided)
Figure 28B:
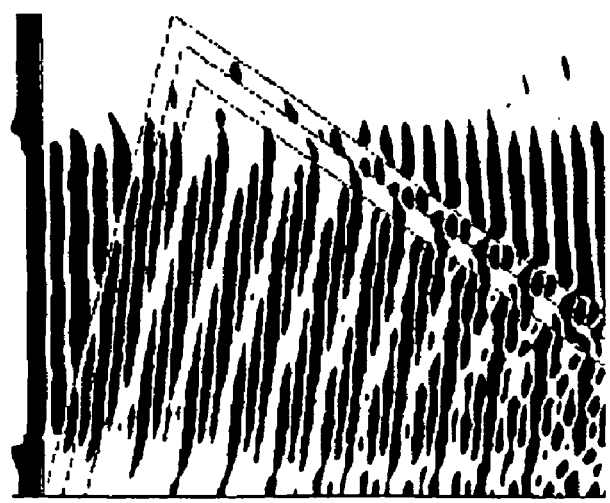

Phase gratings each having a groove structure were formed in the input and output end surfaced respectively.
(Periodic Structure)
period: a
vertical angle: $\theta_P=70°$
(Medium A)
thickness: $t_A=0.8a$
refractive index: $n_A=1.44$
(Medium B)
thickness: $t_B=0.2a$
refractive index: $n_B=2.18$
(Ambient Space)
refractive index: $n_S=1.00$
(Phase Grating)
thickness: $L=0.615a$
(Groove)
width: $G=0.793a$
refractive index: $n_G=2.00$
(Incident Light)
wavelength: $\lambda_0=1.43a$ $(a/\lambda_0=0.699)$
polarization: TE polarization (the direction of electric field was the X-axis direction)
light flux width: $W=5.56a$
incident angle: $\theta_0=15°$
FIGS. 28A and 28B show electric field intensity distributions in a "plane at the center of the medium A" and a "plane at the center of the medium B" as a result of FDTD simulation. In each layer, only the high-order propagation band light propagates in a large part of the one-dimensional photonic crystal portion. It is obvious that output light is formed as light near to a plane wave.

It can be found from FIG. 28A that the vectorial angle of output light is 3.0°.

Calculation Example 4-2

In the condition used in Calculation Example 4-1, only the wavelength of incident light was changed.

(Incident Light)
  wavelength: $\lambda_0=1.54a$ ($a/\lambda_0=0.649$)
  polarization: TE polarization (the direction of electric field was the X-axis direction)

Figure 29A:
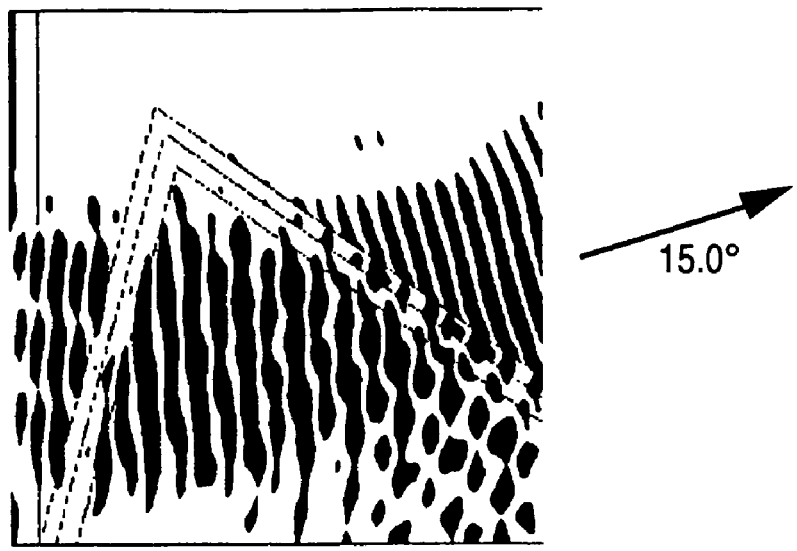
FIGS. 29A and 29D are views showing a result of another electromagnetic wave simulation of refracted light with respect to light obliquely incident onto the one-dimensional photonic crystal (in the case where phase gratings are provided)
Figure 29B:
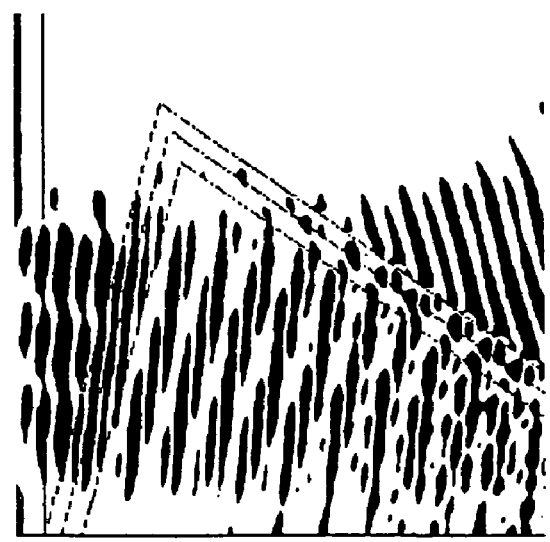

FIGS. 29A and 29B show electric field intensity distributions in a "plane at the center of the medium A" and a "plane at the center of the medium B" as a result of FDTD simulation. In each layer, only the high-order propagation band light propagates in a large part of the one-dimensional photonic crystal portion. It is obvious that output light is formed as light near to a plane wave.

It can be found from FIG. 29A that the vectorial angle of output light is 15.0°.

Calculation Example 4-3

In the condition used in Calculation Example 4-1, only the wavelength of incident light was changed.
(Incident Light)
  wavelength: $\lambda_0=1.66a$ ($a/\lambda_0=0.602$)
  polarization: TE polarization (the direction of electric field was the X-axis direction)

Figure 30A:
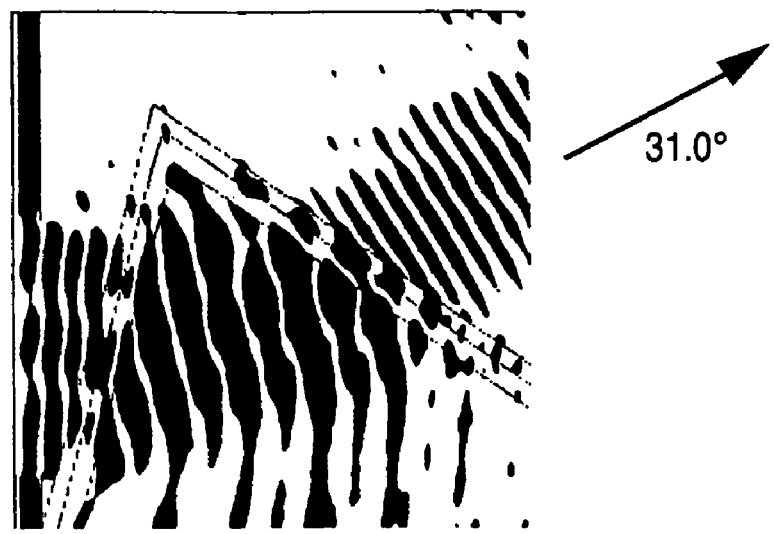
FIGS. 30A and 30B are views showing a result of another electromagnetic wave simulation of refracted light with respect to light obliquely incident onto the one-dimensional photonic crystal (in the case where phase gratings are provided)
Figure 30B:
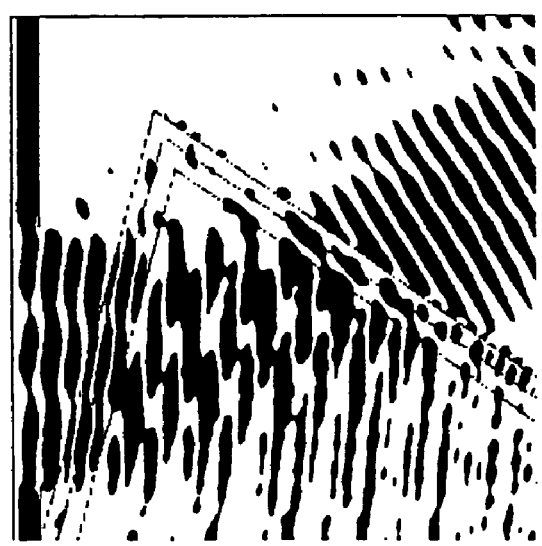

FIGS. 30A and 30B show electric field intensity distributions in a "plane at the center of the medium A" and a "plane at the center of the medium B" as a result of FDTD simulation. In each layer, only the high-order propagation band light propagates in a large part of the one-dimensional photonic crystal portion. It is obvious that output light is formed as light near to a plane wave.

It can be found from FIG. 30A that the vectorial angle of output light is 31.0°.

Calculation Example 4-4

In the condition used in Calculation Example 4-1, only the wavelength of incident light was changed.
(Incident Light)
  wavelength: $\lambda_0=1.818a$ ($a/\lambda_0=0.550$)
  polarization: TE polarization (the direction of electric field was the X-axis direction)

Figure 31A:
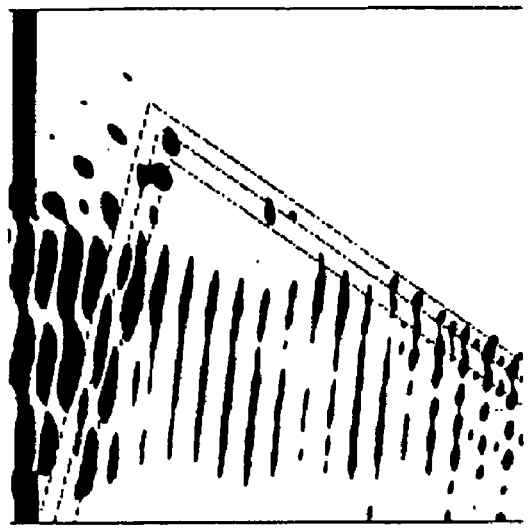
FIGS. 31A and 31B are views showing a result of another electromagnetic wave simulation of refracted light with respect to light obliquely incident onto the one-dimensional photonic crystal (in the case where phase gratings are provided)
Figure 31B:
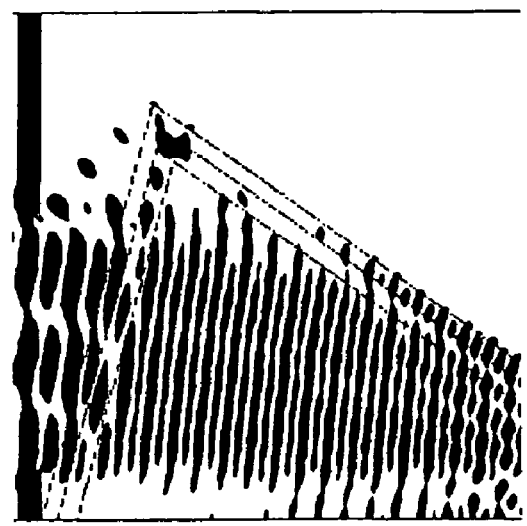

FIGS. 31A and 31B show electric field intensity distributions in a "plane at the center of the medium A" and a "plane at the center of the medium B" as a result of FDTD simulation. Because the high-order propagation band light is absent for the given wavelength, only the first photonic band light appears in each layer.

It is obvious from Calculation Examples 4-1, 4-2 and 4-3 that good plane wave-shaped output light exhibiting large wavelength dispersion in a wide wavelength region can be obtained by the triangular prism structure according to the invention.

Calculation Example 5-1

Simulation of confinement of light in the Y-axis direction was performed in a condition corresponding to Calculation Example 4-3.

The structure of the one-dimensional photonic crystal for guiding wave and the wavelength and polarization of incident light were equal to those in Calculation Example 4-3. The thickness of the phase grating and the thickness of the groove portion were optimized on the assumption that the incident angle $\theta_0$ was zero.
(Phase Grating)
  thickness: L=0.622a
(Groove)
  width: G=0.800a
  refractive index: $n_G=2.00$ The structure of the confinement portion was as follows.
(Confinement Layer)
  period: a'=0.540a The refractive indices of respective layers in the confinement portion and the thickness ratio thereof were equal to those on the waveguide portion.
(Ambient Space)
  refractive index: $n_S=1.00$
(Incident Light)
  Y-axis direction light flux width: 2W'=20a The waveguide portion was formed to have 20 periods. Confinement layers each having 10 periods were disposed on upper and lower surfaces of the waveguide portion. Because this structure was centrosymmetric, only an upper half of the structure was subjected to calculation.

FIG. 32 shows a result (electric field intensity distribution) of simulation of confinement of light in the Y-axis direction. It is obvious that propagation light due to the high-order band in the one-dimensional photonic crystal portion for guiding wave is confined in the Y-axis direction so as not to leak to the outside.

Calculation Example 5-2

Calculation Example 5-2 is the same as Calculation Example 5-1 except the period in each confinement layer.
(Confinement Layer)
  period: a'=1.08a FIG. 33 shows a result (electric field intensity distribution) of simulation of confinement of light in the Y-axis direction. It is obvious that propagation light due to the high-order band in the one-dimensional photonic crystal portion for guiding wave is confined in the Y-axis direction so as not to leak to the outside.

As described above, in accordance with the invention, the fact that refracted light from a multilayer structure exhibits good directivity while the direction of the refracted light has strong wavelength dependence can be used for achieving a spectroscopic device or polarized light separating device of high resolving power without increase in size of the device. Because multilayer structures can be mass-produced relatively inexpensively by an existing technique, reduction in cost of these optical elements can be attained.

What is claimed is:

1. An optical element using one-dimensional photonic crystal, comprising:
   a multilayer structure containing a periodic structural portion as at least one region, said periodic structural portion being regarded as a one-dimensional photonic crystal having repetition of a predetermined period, said multilayer structure having two end surfaces substantially perpendicular to layer surfaces of said multilayer structure and used as a light input surface and a light output surface respectively, wherein:
   said light output surface inclined at an inclination angle to said light input surface; and
   directions of propagation of input beams incident onto said light input surface, beams propagating in said multilayer structure and output beams emerging from said light output surface are perpendicular to a periodic direction of said periodic structural portion.

2. An optical element using one-dimensional photonic crystal according to claim 1, further comprising a phase modulation unit provided adjacent or abutting to said light input surface.

3. An optical element using one-dimensional photonic crystal according to claim 2, further comprising a phase modulation unit provided adjacent or abutting to said light output surface.

4. An optical element using one-dimensional photonic crystal according to claim 1, further comprising a reflecting layer provided on at least one of opposite surfaces of said multilayer structure which are parallel to said layer surfaces.

5. An optical element using one-dimensional photonic crystal according to claim 4, wherein said reflecting layer is made of a periodic multilayer film.

6. An optical element using one-dimensional photonic crystal according to claim 1, wherein electromagnetic wave propagated through said periodic structural portion is propagated as wave belonging to the second lowest coupled photonic band.

7. A spectroscopic device comprising an optical element using one-dimensional photonic crystal, including:
a multilayer structure containing a periodic structural portion as at least one region, said periodic structural portion being regarded as a one-dimensional photonic crystal having repetition of a predetermined period, said multilayer structure having two end surfaces substantially perpendicular to layer surfaces of said multilayer structure and used as a light input surface and a light output surface respectively, wherein:
said light output surface inclined at an inclination angle to said light input surface; and
directions of propagation of input beams incident onto said light input surface, beams propagating in said multilayer structure and output beams emerging from said light output surface are perpendicular to a periodic direction of said periodic structural portion;
a light input optical system for inputting a wavelength division multiplexing optical signal to a light input surface of said optical element, and
a light output optical system for discriminating optical signals spectroscopically output from said optical element in accordance with wavelength.

8. A spectroscopic device according to Clam 7, wherein said light input optical system includes a collimating unit for converting input beams into parallel beams.

9. A spectroscopic device according to claim 8, wherein said light input optical system includes:
a linear optical waveguide or optical fiber for guiding said wavelength division, multiplexing optical signal;
a slab optical waveguide having an input end connected to a light output end of said linear optical fiber, and
an output end connected said light input surface of said optical element; and a beam-condensing element provided in said optical waveguide for converting propagated beams into parallel beams.

10. A spectroscopic device according to claim 7, wherein said light output optical system includes a light coupling unit for coupling said optical signals spectroscopically output from said optical element to a plurality light propagation units.

11. A spectroscopic device according co claim 10, wherein said light output optical system includes:
a slab optical waveguide having an input end connected to said light output surface of said optical element;
a plurality of linear optical waveguides or optical fibers connected to an output end of said slab optical waveguide; and
a beam-condensing element provided in said slab optical waveguide for coupling propagated beams to said plurality of linear optical waveguides or optical fibers.

12. A spectroscopic device according to claim 9, wherein said beam-condensing element is a waveguide lens which is provided in said slab optical waveguide and which is a portion different in refractive index from said slab optical waveguide and shaped like a lens.

13. A spectroscopic device according to claim 9, wherein said beam-condensing element is a diffraction lens provided in said slab optical waveguide.

14. A spectroscopic device according co claim 9, wherein said beam-condensing element is formed as a structure in which a boundary surface between said slab optical waveguide and said light input surface or light output surface of said optical element is formed as a curved surface.

15. A spectroscopic device according to claim 11, wherein said beam-condensing element is a waveguide lens which is provided in said slab optical waveguide and which is a portion different in refractive index from said slab optical waveguide and shaped like a lens.

16. A spectroscopic device according to claim 11, wherein said beam-condensing element is a diffraction lens provided in said slab optical waveguide.

17. A spectroscopic device according to claim 11, wherein said beam-condensing element is formed as a structure in which a boundary surface between said slab optical waveguide and said light input surface or light output surface of said optical element is formed as a curved surface.

18. An optical element using one-dimensional photonic crystal according to claim 1, wherein said light output surface inclined at an acute inclination angle to said light input surface.

19. A spectroscopic device according to claim 7, wherein said light output surface inclined at an acute inclination angle to said light input surface.

20. An optical element using one-dimensional photonic crystal according to claim 2, wherein said phase modulation unit comprises a groove provided near said input surface so that a portion on the outside of the groove serves as a phase grating element which performs phase-modulation of an optical signal.

21. An optical element using one-dimensional photonic crystal according to claim 3, wherein said phase modulation unit comprises a groove provided near said output surface so that a portion on the outside of the groove serves as a phase grating element which performs phase-modulation of an optical signal.

* * * * *